(12) United States Patent
Liu

(10) Patent No.: US 11,349,602 B2
(45) Date of Patent: May 31, 2022

(54) METHOD AND DEVICE FOR DETERMINING AND INDICATING COMMUNICATIONS SYSTEM PARAMETER

(71) Applicant: VIVO MOBILE COMMUNICATION CO., LTD., Dongguan (CN)

(72) Inventor: Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 67 days.

(21) Appl. No.: 17/035,731

(22) Filed: Sep. 29, 2020

(65) Prior Publication Data

US 2021/0013997 A1    Jan. 14, 2021

Related U.S. Application Data

(63) Continuation of application No. PCT/CN2019/081895, filed on Apr. 9, 2019.

(30) Foreign Application Priority Data

Apr. 12, 2018 (CN) .......................... 201810326737.0

(51) Int. Cl.
  *H04L 1/00* (2006.01)
  *H04W 48/10* (2009.01)
  *H04W 72/04* (2009.01)

(52) U.S. Cl.
  CPC .......... *H04L 1/0052* (2013.01); *H04W 48/10* (2013.01); *H04W 72/042* (2013.01); *H04W 72/048* (2013.01)

(58) Field of Classification Search
  None
  See application file for complete search history.

(56) References Cited

U.S. PATENT DOCUMENTS 10,257,657 B2 * 4/2019 Yu .......................... H04L 5/0051
2017/0353819 A1 * 12/2017 Yin ........................ H04L 47/30

FOREIGN PATENT DOCUMENTS

CN     101299744 A      11/2008
WO    2017026477 A1     2/2017

OTHER PUBLICATIONS

First Office Action issued in related Chinese application No. 201810326737.0, dated Mar. 16, 2020, 11 pages.

* cited by examiner

*Primary Examiner* — Hong S Cho
(74) *Attorney, Agent, or Firm* — IPX PLLC

(57) ABSTRACT

This disclosure provides a method for determining a communications system parameter, a method for indicating a communications system parameter, and devices thereof. The method for determining a communications system parameter includes: determining a communications system parameter based on obtained first indication information, and/or determining a communications system parameter based on a mapping relationship between an influencing factor of the communications system parameter and the communications system parameter, where the communications system parameter includes a subcarrier spacing of a sidelink channel, and the communications system parameter is used to decode information carried on the sidelink channel.

20 Claims, 8 Drawing Sheets

102

Determine a communications system parameter based on obtained first indication information, and/or determine a communications system parameter based on a mapping relationship between an influencing factor of the communications system parameter and the communications system parameter, where the communications system parameter includes an SCS of a sidelink channel, and the communications system parameter is used to decode information carried on the sidelink channel

METHOD AND DEVICE FOR DETERMINING AND INDICATING COMMUNICATIONS SYSTEM PARAMETER

CROSS-REFERENCE TO RELATED APPLICATIONS

This application is a bypass continuation of PCT Application No. PCT/CN2019/081895 filed Apr. 9, 2019, which claims priority to Chinese Patent Application No. 201810326737.0, filed in China on Apr. 12, 2018, both of which are incorporated herein by reference in their entireties.

TECHNICAL FIELD

This disclosure relates to the field of communications technologies, and in particular, to a method for determining a communications system parameter, a method for indicating a communications system parameter, and devices thereof.

BACKGROUND

Currently, a New Radio Access Technology (NR) of a fifth-generation mobile communications technology (5G) supports a plurality of communications system parameters (Numerology), and the communications system parameters may be defined by a subcarrier spacing, a cyclic prefix, and the like. On an NR sidelink, there may be a plurality of possibilities for a communications system parameter. For example, a subcarrier spacing may be 15 kHz, 30 kHz, 60 kHz, 120 kHz, or 240 kHz.

Generally, when a transmit-end device transmits information to a receive-end device, the transmit-end device needs to encode the information by using a communications system parameter, and transmit the information to the receive-end device by using a sidelink channel. Correspondingly, after the receive-end device receives the information transmitted by the transmit-end device by using the sidelink channel, the receive-end device needs to decode, by using the same communications system parameter used for encoding by the transmit-end device, the information carried on the sidelink channel. However, the receive-end device does not know a specific parameter value of the communications system parameter used by the transmit-end device.

In the related art, after the receive-end device receives the information, the receive-end device generally determines, in a blind detection mode, the communications system parameter for decoding. However, use of the blind detection mode greatly increases workload of the receive-end device, and causes high complexity of decoding by the receive-end device. This problem needs to be resolved urgently.

SUMMARY

Embodiments of this disclosure are intended to provide a method for determining a communications system parameter, a method for indicating a communications system parameter, and devices thereof, to resolve a problem of high workload of a receive-end device and high complexity of decoding by the receive-end device.

To resolve the foregoing technical problem, the embodiments of this disclosure are implemented as follows:

According to a first aspect, an embodiment of this disclosure provides a method for determining a communications system parameter, where the method is applied to a receive-end device and includes:

determining a communications system parameter based on obtained first indication information, and/or determining a communications system parameter based on a mapping relationship between an influencing factor of the communications system parameter and the communications system parameter, where the communications system parameter includes a Subcarrier Spacing (SCS) of a sidelink channel, and the communications system parameter is used to decode information carried on the sidelink channel.

According to a second aspect, an embodiment of this disclosure further provides a method for indicating a communications system parameter, where the method is applied to a network-side device and includes:

determining a communications system parameter based on a mapping relationship between an influencing factor of the communications system parameter and the communications system parameter, where the communications system parameter includes a SCS of a sidelink channel; and transmitting first indication information to a receive-end device, where the first indication information is used to indicate the communications system parameter, and the communications system parameter is used by the receive-end device to decode information carried on the sidelink channel.

According to a third aspect, an embodiment of this disclosure further provides a method for indicating a communications system parameter, where the method is applied to a transmit-end device and includes:

determining a communications system parameter, wherein the communications system parameter is determined based on obtained second indication information, and/or determined based on a mapping relationship between an influencing factor of the communications system parameter and the communications system parameter, and the communications system parameter comprises a subcarrier spacing SCS of a sidelink channel; and transmitting first indication information to a receive-end device, where the first indication information is used to indicate the communications system parameter, and the communications system parameter is used by the receive-end device to decode information carried on the sidelink channel.

According to a fourth aspect, an embodiment of this disclosure further provides a receive-end device, including:

a first determining module, configured to determine a communications system parameter based on obtained first indication information, and/or determine a communications system parameter based on a mapping relationship between an influencing factor of the communications system parameter and the communications system parameter, where the communications system parameter includes a SCS of a sidelink channel, and the communications system parameter is used to decode information carried on the sidelink channel.

According to a fifth aspect, an embodiment of this disclosure further provides a network-side device, including:

a second determining module, configured to determine a communications system parameter based on a mapping relationship between an influencing factor of the communications system parameter and the communications system parameter, where the communications system parameter includes a SCS of the sidelink channel; and a first transmission module, configured to transmit first indication information to a receive-end device, where the first indication information is used to indicate the communications system parameter, and the communications system parameter is used by the receive-end device to decode information carried on the sidelink channel.

According to a sixth aspect, an embodiment of this disclosure further provides a transmit-end device, including:

a third determining module, configured to determine a communications system parameter based on a mapping relationship between an influencing factor of the communications system parameter and the communications system parameter, where the communications system parameter includes a SCS of the sidelink channel; and a second transmission module, configured to transmit first indication information to a receive-end device, where the first indication information is used to indicate the communications system parameter, and the communications system parameter is used by the receive-end device to decode information carried on the sidelink channel.

According to a seventh aspect, an embodiment of this disclosure further provides a receive-end device, including a memory, a processor, and a program that is stored in the memory and capable of running by the processor, where when the program is executed by the processor, the steps of the method for determining a communications system parameter according to the first aspect are implemented.

According to an eighth aspect, an embodiment of this disclosure further provides a network-side device, including a memory, a processor, and a program that is stored in the memory and capable of running by the processor, where when the program is executed by the processor, the steps of the method for indicating a communications system parameter according to the second aspect are implemented.

According to a ninth aspect, an embodiment of this disclosure further provides a transmit-end device, including a memory, a processor, and a program that is stored in the memory and capable of running by the processor, where when the program is executed by the processor, the steps of the method for indicating a communications system parameter according to the third aspect are implemented.

According to a tenth aspect, an embodiment of this disclosure provides a computer-readable storage medium, where the computer-readable storage medium stores a program, and when the program is executed by a processor, the steps of the method for determining a communications system parameter according to the first aspect are implemented; or when the program is executed by a processor, the steps of the method for indicating a communications system parameter according to the second aspect are implemented; or when the program is executed by a processor, the steps of the method for indicating a communications system parameter according to the third aspect are implemented.

According to the method for determining a communications system parameter, the method for indicating a communications system parameter, and the device in the embodiments of this disclosure, the receive-end device may determine the communications system parameter from the obtained first indication information indicating the communications system parameter, and/or determine the communications system parameter based on the mapping relationship between the influencing factor of the communications system parameter and the communications system parameter. This prevents the receive-end device from searching for the communications system parameter in a blind detection mode. Therefore, workload of the receive-end device and complexity of decoding by the receive-end device can be reduced, and communication efficiency can be improved.

BRIEF DESCRIPTION OF DRAWINGS

The drawings described herein are used to provide a further understanding about this disclosure, and constitute a part of this disclosure. Exemplary embodiments of this disclosure and descriptions thereof are used to explain this disclosure, but do not constitute any inappropriate limitation on this disclosure. In the drawings.

DETAILED DESCRIPTION

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure. The term "and/or" used in this specification and claims indicates at least one of connected objects.

The technical solutions of this disclosure may be applied to various communications systems, such as a Global System of Mobile Communications (GSM), Code Division Multiple Access (CDMA), Wideband Code Division Multiple Access (WCDMA), General Packet Radio Service (GPRS), Long Term Evolution (LTE) or Long Term Evolution Advanced (LTE-A), and New Radio (NR).

User Equipment (UE) may also be referred to as a user end, a mobile terminal, mobile user equipment, or the like.

The user equipment may communicate with one or more core networks through a Radio Access Network (RAN). The user equipment may be a mobile terminal, such as a mobile phone (also referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

A network-side device is configured to communicate with the user equipment, and may be a Base Transceiver Station (BTS) in GSM or CDMA, or may be a NodeB in WCDMA, or may be an evolved NodeB (eNB or e-NodeB) in LTE, or a 5G gNB (gNB). This is not limited in this disclosure. However, for ease of description, the following embodiments use the gNB as an example for description.

The technical solution provided by each embodiment of this disclosure is hereinafter described in detail with reference to accompanying drawings.

The following describes English acronyms and abbreviations used in the embodiments of this disclosure:
Sidelink Control Information (SCI);
Reference Signal Receiving Power (RSRP);
Signal to Interference plus Noise Ratio (SINR);
system broadcast information (System Information, SI);
Radio Resource Control (RRC);
Downlink Control Information (DCI);
Bandwidth Part (BWP);
sidelink (Sidelink);
Subcarrier Spacing (SCS); and
Cycle Prefix (CP).

In the embodiments of this disclosure, English full names and English acronyms and abbreviations corresponding to the foregoing Chinese terms include but are not limited to those listed above. For example, the English acronym of the bandwidth part includes but is not limited to BWP. Only possible English full names and English acronyms and abbreviations are listed in the embodiments, but English full names and English acronyms and abbreviations are not limited thereto.

Figure 1:
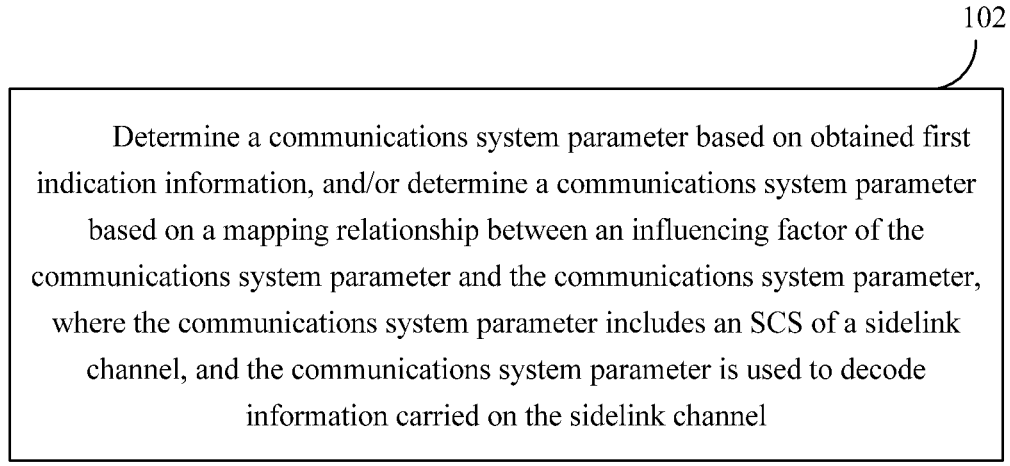
FIG. 1 is a flowchart of a method for determining a communications system parameter according to an embodiment of this disclosure.

An embodiment of this disclosure provides a method for determining a communications system parameter. The method is applied to a receive-end device, and may be performed by the receive-end device. The receive-end device is a terminal device that receives information transmitted by a transmit-end device. FIG. 1 is a flowchart of a method for determining a communications system parameter according to an embodiment of this disclosure. As shown in FIG. 1, the method includes at least the following steps.

Step 102: Determine a communications system parameter based on obtained first indication information, and/or determine a communications system parameter based on a mapping relationship between an influencing factor of the communications system parameter and the communications system parameter.

The communications system parameter includes an SCS of a sidelink channel, and the communications system parameter is used to decode information carried on the sidelink channel.

The information carried on the sidelink channel is information transmitted by a transmit-end device to a receive-end device by using the sidelink channel.

In an embodiment of this disclosure, the communications system parameter may further include a CP of the sidelink channel or a bandwidth part of the sidelink channel, in addition to the SCS of the sidelink channel.

In the foregoing step 102, the communications system parameter may be determined at least in the following three manners:

first manner: determine the communications system parameter based on the obtained first indication information;

second manner: determine the communications system parameter based on the mapping relationship between the influencing factor of the communications system parameter and the communications system parameter; and third manner: determine the communications system parameter based on the obtained first indication information and the mapping relationship between the influencing factor of the communications system parameter and the communications system parameter.

In this embodiment of this disclosure, the communications system parameter includes a first communications system parameter for decoding information carried on a physical sidelink control channel, and/or a second communications system parameter for decoding information carried on a physical sidelink data channel.

Specifically, in this embodiment of this disclosure, the communications system parameter may include only the first communications system parameter, or the communications system parameter may include only the second communications system parameter, or the communications system parameter includes the first communications system parameter and the second communications system parameter.

The sidelink channel in the foregoing step 102 may include only the physical sidelink control channel, or include only the physical sidelink data channel, or include the physical sidelink data channel and the physical sidelink control channel.

Therefore, in this embodiment of this disclosure, if the sidelink channel includes only the physical sidelink control channel, correspondingly, the communications system parameter includes only the first communications system parameter; if the sidelink channel includes only the physical sidelink data channel, correspondingly, the communications system parameter includes only the second communications system parameter; or if the sidelink channel includes the physical sidelink control channel and the physical sidelink data channel, correspondingly, the communications system parameter includes the first communications system parameter and the second communications system parameter.

The following describes in detail specific implementation processes of the foregoing listed three manners of determining the communications system parameter.

First manner: Determine the communications system parameter based on the obtained first indication information.

In this embodiment of this disclosure, the first indication information in step 102 may come from the transmit-end device, or may come from a network-side device. Specifically, if the first indication information indicates the first communications system parameter, the first indication information is obtained from a network message transmitted by the network-side device.

If the first indication information indicates the second communications system parameter, the first indication information may be obtained in either of the following manners:

obtaining from a network message transmitted by the network-side device; and obtaining from information that is obtained by decoding SCI information on the physical sidelink control channel based on the first communications system parameter.

Specifically, after the SCI information carried on the physical sidelink control channel is decoded based on the first communications system parameter, if the first indication information indicating the second communications system parameter exists in the decoded SCI information, the first indication information indicating the second communications system parameter is obtained from the decoded SCI information, and the second communications system parameter is determined based on the first indication information, and then the information carried on the physical sidelink data channel is decoded by using the second communications system parameter; or if the first indication information indicating the second communications system parameter does not exist in the decoded SCI information, the physical sidelink data channel is decoded by using the first communications system parameter.

In this embodiment of this disclosure, the network-side device adds, to the network message, the first indication information indicating the communications system parameter, and transmits the network message to the receive-end device. Therefore, the receive-end device needs to obtain the first indication information from the network message transmitted by the network-side device.

The network message transmitted by the network-side device includes any one of the following messages:

SI information, an RRC message, and DCI information.

The foregoing lists only three possible specific types of network messages. In addition, the network message may also be of other message types. This is an example for description only, and does not constitute a limitation on a specific type of network message.

Specifically, if the message transmitted by the network-side device is the SI information, the first indication information indicating the communications system parameter is carried in the SI information, and the receive-end device needs to obtain the first indication information from the received SI information; if the information indicating the communications system parameter is carried in the RRC message, the receive-end device needs to obtain the first indication information from the received RRC message; or if the information indicating the communications system parameter is carried in the DCI information, the receive-end device needs to obtain the first indication information from the received DCI information.

In this embodiment of this disclosure, the first indication information may carry an identifier of the communications system parameter, and the communications system parameter is indicated by using the identifier of the communications system parameter.

Specifically, the identifier of the communications system parameter may be a bit corresponding to the communications system parameter, and different bits may be configured to correspond to different communications system parameters. For ease of understanding, the following provides an example for description.

For example, the communications system parameter is the SCS, and the bit may be set to 1 to indicate that the SCS is 15 kHz, or the bit is set to 0 to indicate that the SCS is 30 kHz. In this case, if the bit carried in the first indication information obtained by the receive-end device is 0, it may be determined that the SCS of the sidelink channel is 30 kHz; or if the bit carried in the obtained first indication information is 1, it may be determined that the SCS of the sidelink channel is 15 kHz.

In addition, when information is transmitted between the transmit-end device and the receive-end device by using the sidelink channel, the information may be transmitted in a low-frequency band or a high-frequency band. For example, in the low-frequency band, the SCS of the sidelink channel may be 15 kHz and 30 kHz, but in the high-frequency band, the SCS of the sidelink channel may be 60 kHz and 120 kHz. For example, for the SCS of the sidelink channel, in the low-frequency band, 0 may be configured to indicate that the SCS is 15 kHz, and 1 may be configured to indicate that the SCS is 30 kHz; in the high-frequency band, 0 may be configured to indicate that the SCS is 60 kHz, and 1 may be configured to indicate that the SCS is 120 kHz. Therefore, after receiving the information transmitted by the transmit-end device, if determining that the information is transmitted in the low-frequency band and that the bit carried in the obtained first indication information is 0, the receive-end device may determine that the SCS of the sidelink channel is 15 kHz. In this case, 15 kHz may be used to decode the information carried on the sidelink channel.

In this embodiment of this disclosure, because the first indication information is transmitted by the network-side device or the transmit-end device to the receive-end device, the SCS indicated by each bit in the first indication information is also configured by the network-side device or the transmit-end device.

In this embodiment of this disclosure, if the sidelink channel includes only the physical sidelink control channel, the first indication information indicates the first communications system parameter, and the first indication information may be obtained in a manner of obtaining the first indication information when the first communications system parameter is indicated.

If the sidelink channel includes only the physical sidelink data channel, the first indication information indicates the second communications system parameter, and the first indication information may be obtained in a manner of obtaining the first indication information when the second communications system parameter is indicated.

If the sidelink channel includes the physical sidelink control channel and the physical sidelink data channel, the first indication information needs to indicate not only the first communications system parameter but also the second communications system parameter. In this case, manners of obtaining the first indication information include at least the following manners:

1. Both the first indication information indicating the first communications system parameter and the first indication information indicating the second communications system parameter are obtained from the network message transmitted by the network-side device.

For ease of understanding, the following uses specific embodiments for description.

In a specific implementation, the network-side device periodically or aperiodically detects each influencing factor that affects the communications system parameter, determines the first communications system parameter and the second communications system parameter based on the detected influencing factor and the mapping relationship between the influencing factor and the communications system parameter, and when the first communications system parameter and the second communications system parameter change, adds, to the network message, the first indication information indicating the first communications system parameter and the second communications system parameter, and transmits the network message to the receive-end device. After receiving the network message transmitted by the network-side device, the receive-end device obtains the first indication information from the network message, and determines the first communications system parameter and the second communications system parameter based on the first indication information; and then the receive-end device uses the first communications system parameter to decode the information carried on the physical sidelink control channel, and uses the second communications system parameter to decode the information carried on the physical sidelink data channel.

In a specific implementation, if the first indication information indicates the first communications system parameter and the second communications system parameter, the first indication information may carry two bits, where a first bit indicates the first communications system parameter, and a second bit indicates the second communications system parameter; or two bits may jointly indicate the first communications system parameter and the second communications system parameter. For example, for the SCS, in the low-frequency band, 00 may be configured to indicate that both the SCS of the physical sidelink control channel and the SCS of the physical sidelink data channel are 15 kHz; or 01 may be configured to indicate that the SCS of the physical sidelink control channel is 15 kHz and that the SCS of the physical sidelink data channel is 30 kHz. In the high-frequency band, 00 may be configured to indicate that both the SCS of the physical sidelink control channel and the SCS of the physical sidelink data channel are 60 kHz; or 01 may be configured to indicate that the SCS of the physical sidelink control channel is 60 kHz and that the SCS of the physical sidelink data channel is 120 kHz. After receiving the information transmitted by the transmit-end device by using the sidelink channel, if determining that the information is transmitted in the low-frequency band and that the bits carried in the obtained first indication information are 01, the receive-end device may determine that the SCS of the physical sidelink control channel is 15 kHz and that the SCS of the physical sidelink data channel is 30 kHz, and then use 15 kHz to decode the information carried on the physical sidelink control channel and use 30 kHz to decode the information carried on the physical sidelink data channel.

Certainly, the foregoing only illustrates a specific configuration manner of the first indication information indicating the first communications system parameter and the second communications system parameter. In this case, a specific configuration manner of the first indication information may be another manner, and is not limited herein.

2. The first indication information indicating the first communications system parameter is obtained from the network message transmitted by the network-side device, and the first indication information indicating the second communications system parameter is obtained from the information obtained by decoding the SCI information on the physical sidelink control channel based on the first communications system parameter.

For ease of understanding, the following uses specific embodiments for description.

In a specific implementation, the network-side device adds, to the network message, the first indication information indicating the first communications system parameter, and transmits the network message to the receive-end device; the transmit-end device adds, to the SCI information, the first indication information indicating the second communications system parameter, and transmits the SCI information to the receive-end device by using the physical sidelink control channel; after receiving the network message transmitted by the network-side device, the receive-end device obtains, from the network message, the first indication information indicating the first communications system parameter, and determines the first communications system parameter based on the first indication information; and then the receive-end device uses the first communications system parameter to decode the information carried on the physical sidelink control channel. Because the physical sidelink control channel carries the SCI information, in a process of using the first communications system parameter to decode the information carried on the physical sidelink control channel, the SCI information is also decoded, and the first indication information indicating the second communications system parameter is obtained from the decoded SCI information; and then the second communications system parameter is determined based on the first indication information, and the second communications system parameter is used to decode the information carried on the physical sidelink data channel.

Specifically, in the foregoing implementation, the SCI information may carry the first indication information indicating the second communications system parameter, or may not carry the first indication information indicating the second communications system parameter. If the decoded SCI information does not include the first indication information indicating the second communications system parameter, the receive-end device directly uses the first communications system parameter to decode the information carried on the physical sidelink data channel.

For ease of understanding, the following provides an example for description.

When the communications system parameter of the transmit-end device changes, the network-side device transmits a network message to the receive-end device, where the network message carries the first indication information indicating the first communications system parameter, and the transmit-end device transmits the SCI information to the receive-end device. For example, for the SCS, when the information transmitted by the transmit-end device to the receive-end device by using the sidelink channel is transmitted in the low-frequency band, the network-side device may set the SCS indicated by 0 to 15 kHz, and set the SCS indicated by 1 to 30 kHz; or when the information transmitted by the transmit-end device to the receive-end device by using the sidelink channel is transmitted in the high-frequency band, the network-side device may set the SCS indicated by 0 to 60 kHz, and set the SCS indicated by 1 to 120 kHz. When the information transmitted by the transmit-end device to the receive-end device by using the sidelink channel is transmitted in the low-frequency band, the transmit-end device may set the SCS indicated by 0 to 15 kHz, and set the SCS indicated by 1 to 30 kHz; or when the information transmitted by the transmit-end device to the receive-end device by using the sidelink channel is transmitted in the high-frequency band, the transmit-end device may set the SCS indicated by 0 to 60 kHz, and set the SCS indicated by 1 to 120 kHz.

Therefore, after the receive-end device receives the information transmitted by the transmit-end device by using the sidelink channel, if determining that the information is transmitted in the low-frequency band and that the bit carried in the first indication information obtained from the network message is 0, the receive-end device uses 15 kHz to decode the information carried on the physical sidelink control channel, and then obtains, from the decoded SCI information, the first indication information carried in the SCI information; and if the first indication information is obtained from the SCI information, and the bit carried in the first indication information is 1, the receive-end device uses 30 kHz to decode the information carried on the physical sidelink data channel.

If no first indication information is obtained from the SCI information, the receive-end device uses 15 kHz to decode the information carried on the physical sidelink data channel.

In this embodiment of this disclosure, the SCI information may carry the first indication information, or the SCI information may not carry the first indication information. If the SCI information does not carry the first indication information, the receive-end device directly uses the first communications system parameter to decode the information carried on the physical sidelink data channel. This can reduce the amount of information transmitted on the physical sidelink control channel, and therefore can save resources.

Second manner: The receive-end device determines the communications system parameter based on the mapping relationship between the influencing factor of the communications system parameter and the communications system parameter.

In this implementation, the receive-end device may detect each influencing factor of the communications system parameter, and then determine the communications system parameter based on a mapping relationship between each influencing factor and the communications system parameter.

In this manner, there may be a plurality of specific implementations of determining the communications system parameter based on the mapping relationship between the influencing factor of the communications system parameter and the communications system parameter. The following describes in detail two of the specific implementations.

In a specific implementation, determining the communications system parameter based on the mapping relationship between the influencing factor of the communications system parameter and the communications system parameter may include the following step (1) and step (2):

step (1): determine the bandwidth part of the sidelink channel based on a first mapping relationship between the influencing factor of the communications system parameter and the bandwidth part; and step (2): determine the SCS of the sidelink channel based on a second mapping relationship between the bandwidth part of the sidelink channel and the SCS.

If the communications system parameter further includes the CP of the sidelink channel, after the SCS of the sidelink channel is determined, the CP of the sidelink channel may be determined based on the SCS of the sidelink channel.

The influencing factor includes at least one of the following:

an absolute moving speed of the transmit-end device, an absolute moving speed of the receive-end device, a relative moving speed between the transmit-end device and the receive-end device, a related parameter of a service currently being processed by the receive-end device, and a status measurement value of the sidelink channel.

The relative moving speed between the transmit-end device and the receive-end device includes the following two cases: a relative moving speed of the transmit-end device relative to the receive-end device, and a relative moving speed of the receive-end device relative to the transmit-end device.

Specifically, in this embodiment of this disclosure, the influencing factor may be one or more of the absolute moving speed of the transmit-end device, the absolute moving speed of the receive-end device, the relative moving speed between the transmit-end device and the receive-end device, the related parameter of the service currently being processed by the receive-end device, and the status measurement value of the sidelink channel.

The related parameter of the service includes at least one of the following:

a priority of the service, a latency requirement of the service, reliability of the service, a throughput requirement of the service, and a bandwidth occupied by the service; and the status measurement value of the sidelink channel includes at least one of the following:

a frequency offset value, an RSRP value, and an SINR value.

In this embodiment of this disclosure, the related parameter of the service may include one or more of the priority of the service, the latency requirement of the service, the reliability of the service, the throughput requirement of the service, and the bandwidth occupied by the service. Likewise, the status measurement value of the sidelink channel may include one or more of the frequency offset value, the RSRP value, and the SINR value.

For ease of understanding, the following describes a specific process of determining the bandwidth part of the sidelink channel based on the first mapping relationship between each influencing factor and the bandwidth part.

If the influencing factor is the absolute moving speed of the transmit-end device, a possible value range of the absolute moving speed of the transmit-end device may be determined, and the value range is divided into several intervals, and then a first mapping relationship between each interval and the bandwidth part is established. In this embodiment, the absolute moving speed of the transmit-end device may be denoted as V. Specifically, when the absolute moving speed of the transmit-end device changes, and especially changes in a vicinity of a critical point between two intervals, frequent switching of the absolute moving speed of the transmit-end device in the vicinity of the critical point causes frequent switching of the corresponding bandwidth part, and consequently, complexity of work and power consumption of the receive-end device are increased. To avoid this case, in this embodiment of this disclosure, a buffer space may be set between intervals. Specifically, the buffer space may be denoted as θ. Therefore, a plurality of intervals obtained by dividing the absolute moving speed of the transmit-end device may be $[V_1, V_2], [V_2+\theta, V_3], [V_3+\theta, V_4], \ldots, [V_N+\theta, V_{N+1}]$. Correspondingly, a bandwidth part corresponding to $[V_1, V_2]$ is $BWP_0$ to $BWP_N$, a bandwidth part corresponding to $[V_2+\theta, V_3]$ is $BWP_{N+1}$ to $BWP_M$, a bandwidth part corresponding to $[V_3+\theta, V_4]$ is $BWP_{M+1}$ to $BWP_K$, and a bandwidth part corresponding to $[V_N+\theta, V_{N+1}]$ is $BWP_X$ to $BWP_Y$. When the absolute moving speed of the transmit-end device is greater than $V_{N+1}$, a bandwidth part corresponding to the absolute moving speed of the transmit-end device is still $BWP_X$ to $BWP_Y$. In this embodiment of this disclosure, when it is detected that the absolute moving speed of the transmit-end device is in the interval $[V_2+\theta, V_3]$, it may be determined, based on the first mapping relationship, that the bandwidth part of the sidelink channel is $BWP_{N+1}$ to $BWP_M$; or when it is detected that the absolute moving speed of the transmit-end device is in the interval $[V_3+\theta, V_4]$, it may be determined, based on the first mapping relationship, that the bandwidth part of the sidelink channel is $BWP_{M+1}$ to $BWP_K$.

The foregoing symbols N, M, K, X, and Y are all positive integers.

Figure 2:
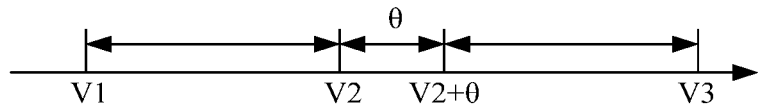
FIG. 2 is a schematic diagram of speed interval division of an absolute moving speed of a transmit-end device in a method for determining a communications system parameter according to an embodiment of this disclosure.

For ease of understanding, with reference to the example of the schematic diagram of interval division of the absolute moving speed of the transmit-end device shown in FIG. 2, the following describes how to determine the bandwidth part of the sidelink channel based on the first mapping relationship and the detected absolute moving speed of the transmit-end device.

In FIG. 2, when the absolute moving speed of the transmit-end device constantly changes in a vicinity of $V_2$, if it is detected that the absolute moving speed of the transmit-end device is less than $V_2+\theta$, the bandwidth part of the sidelink channel is still the bandwidth part corresponding to the interval $[V_1, V_2]$; or if it is detected that the absolute moving speed of the transmit-end device is greater than $V_2+\theta$, the bandwidth part of the sidelink channel is the bandwidth part corresponding to the interval $[V_2+\theta, V_3]$. For example, if the bandwidth part corresponding to the interval $[V_1, V_2]$ is $BWP_1$, and the bandwidth part corresponding to the interval $[V_2+\theta, V_3]$ is $BWP_{20}$, if the absolute moving speed of the transmit-end device has exceeded $V_2$ but is less than $V_2+\theta$, the bandwidth part of the sidelink channel is $BWP_1$; or if the absolute moving speed of the transmit-end device is greater than $V_2+\theta$, the bandwidth part of the sidelink channel is $BWP_{20}$.

Certainly, only two intervals $[V_1, V_2]$ and $[V_2+\theta, V_3]$ are shown in FIG. 2. However, a quantity of intervals actually obtained by division may be other values, and is not limited to this. FIG. 2 is an example for description only.

In addition, in this embodiment of this disclosure, buffer spaces set between various speed intervals may be the same or may be different.

The foregoing describes how to determine the bandwidth part of the sidelink channel based on the absolute moving speed of the transmit-end device and the first mapping relationship between the absolute moving speed of the transmit-end device and the bandwidth part. For the absolute moving speed of the receive-end device, the relative moving speed of the transmit-end device relative to the receive-end device, and the relative moving speed of the receive-end device relative to the transmit-end device, refer to the foregoing embodiment. Details are not described again herein.

If the influencing factor of the communications system parameter is the service priority of the service currently being processed by the receive-end device, the service priority may be divided into priorities $P_1, P_2, P_3, \ldots, P_N$. Bandwidth parts sequentially corresponding to the N priorities are $BWP_0$ to $BWP_N$, $BWP_{N+1}$ to $BWP_M$, $BWP_{M+1}$ to $BWP_V, \ldots, BWP_W$-$BWP_Q$ respectively. Values of N, M, V, W, and Q are all positive integers. After detecting the priority of the service currently being processed, the receive-end device determines, based on the first mapping relationship between the priority and the bandwidth part, the bandwidth part corresponding to the priority, and determines the determined bandwidth part as the bandwidth part of the sidelink channel.

If the influencing factor of the communications system parameter is the latency requirement of the service currently being processed by the receive-end device, a value range of the latency requirement of the service that may occur is divided into the following intervals: $[t_0$ to $t_1]$, $[t_1$ to $t_2]$, $[t_2$ to $t_3]$, $\ldots$, $[t_0$ to $t_{n+1}]$, and bandwidth parts sequentially corresponding to the foregoing intervals are $BWP_0$ to $BWP_N$, $BWP_{N+1}$ to $BWP_M$, $BWP_{M+1}$ to $BWP_V, \ldots, BWP_W$ to $BWP_Q$. In addition, when a value of the latency requirement of the service is higher than $t_{n+1}$, a bandwidth part corresponding to the latency requirement of the service is determined as $BWP_X$ to $BWP_Y$. Values of N, M, V, W, Q, X, and Y are all positive integers. If the receive-end device detects that the latency requirement of the service currently being processed is T, the receive-end device determines a latency requirement interval in which the latency requirement T is located, and then determines a bandwidth part corresponding to the latency requirement interval as the bandwidth part of the sidelink channel.

If the influencing factor of the communications system parameter is service reliability of the service currently being processed by the receive-end device, the service reliability is generally a bit error rate or a block error rate required by the service, and the bit error rate or the block error rate required by the service may be divided into a plurality of intervals as follows: lower than $B_1$, $[B_1, B_2]$, $[B_2, B_3,]$, $\ldots$, $[B_{N-1}, B_N]$, and bandwidth parts sequentially corresponding to the intervals are $BWP_0$ to $BWP_K$, $BWP_{K+1}$ to $BWP_M$, $BWP_{M+1}$ to $BWP_V, \ldots, BWP_W$ to $BWP_Q$. In addition, when the bit error rate or the block error rate of the service is higher than $B_N$, a bandwidth part corresponding to the bit error rate or the block error rate is determined as $BWP_X$ to $BWP_Y$. Values of N, M, V, W, Q, X, and Y are all positive integers. After the receive-end device detects the bit error rate or the block error rate required by the service currently being processed, the receive-end device determines an interval in which the currently detected bit error rate or block error rate is located, and then determines a bandwidth part corresponding to the interval as the bandwidth part of the sidelink channel.

If the influencing factor of the communications system parameter is a throughput requirement of the service currently being processed by the receive-end device, a possible value range of the throughput requirement of the service may be divided into a plurality of intervals as follows: $[T_0$ to $T_1]$, $[T_1$ to $T_2]$, $[T_2$ to $T_3]$, $\ldots$, $[T_n$ to $T_{n+1}]$, and bandwidth parts sequentially corresponding to the foregoing intervals are: $BWP_0$ to $BWP_N$, $BWP_{N+1}$ to $BWP_M$, $BWP_{M+1}$ to $BWP_V$, $BWP_W$ to $BWP_Q$. In addition, if the throughput requirement of the service is higher than $T_{n+1}$, a bandwidth part corresponding to the throughput requirement is determined as $BWP_X$ to $BWP_Y$. Values of N, M, V, W, Q, X, and Y are all positive integers. If the receive-end device detects that the throughput requirement of the service currently being processed is T, the receive-end device first determines an interval corresponding to T, and then determines a bandwidth part corresponding to the interval as the bandwidth part of the sidelink channel.

If the influencing factor of the communications system parameter is the bandwidth occupied by the service currently being processed by the receive-end device, a possible value range of the bandwidth occupied by the service may be divided into a plurality of intervals as follows: $[B_0$ to $B_1]$, $[B_1$ to $B_2]$, $[B_2$ to $B_3]$, $\ldots$, $[B_n$ to $B_{n+1}]$, and bandwidth parts sequentially corresponding to the bandwidth intervals are: $BWP_0$ to $BWP_N$, $BWP_{N+1}$ to $BWP_M$, $BWP_{M+1}$ to $BWP_V, \ldots, BWP_W$ to $BWP_Q$. In addition, if the bandwidth occupied by the service is higher than $B_{n+1}$, a bandwidth part corresponding to the bandwidth is determined as $BWP_X$ to $BWP_Y$. Values of N, M, V, W, Q, X, and Y are all positive integers. After detecting the bandwidth occupied by the service currently being processed, the receive-end device determines an interval corresponding to the bandwidth occupied by the service currently being processed, and determines a bandwidth part corresponding to the bandwidth interval as the bandwidth part of the sidelink channel.

If the influencing factor of the communications system parameter is the RSRP value of the sidelink channel, a possible value range of the RSRP value of the sidelink channel may be divided into a plurality of intervals as follows: $[R_0$ to $R_1]$, $[R_1$ to $R_2]$, $[R_2$ to $R_3]$, $\ldots$, $[R_n$ to $R_{n+1}]$, and bandwidth parts sequentially corresponding to the plurality of intervals are $BWP_0$ to $BWP_N$, $BWP_{N+1}$ to $BWP_M$, $BWP_{M+1}$ to $BWP_V$, $BWP_W$ to $BWP_Q$. In addition, if the RSRP value of the sidelink channel is higher than $R_{n+1}$, a bandwidth part corresponding to the RSRP value is determined as $BWP_X$ to $BWP_Y$. Values of N, M, V, W, Q, X, and Y are all positive integers. After detecting the current RSRP value of the sidelink channel, the receive-end device determines an RSRP interval corresponding to the currently detected RSRP value, and determines a bandwidth part corresponding to the RSRP interval as the bandwidth part of the sidelink channel.

If the influencing factor of the communications system parameter is the SINR value of the sidelink channel, a possible value range of the SINR value of the sidelink channel may be divided into a plurality of intervals as follows: $[S_0$ to $S_1]$, $[S_1$ to $S_2]$, $[S_2$ to $S_3]$, ..., $[S_n$ to $S_{n+1}]$, and bandwidth parts sequentially corresponding to the intervals are $BWP_0$ to $BWP_N$, $BWP_{N+1}$ to $BWP_M$, $BWP_{M+1}$ to $BWP_V$, $BWP_W$ to $BWP_Q$. In addition, when the current SINR value of the sidelink channel is higher than $S_{n+1}$, a bandwidth part corresponding to the SINR value is determined as $BWP_X$ to $BWP_Y$. Values of N, M, V, W, Q, X, and Y are all positive integers. After detecting the current SINR value of the sidelink channel, the receive-end device determines an SINR interval corresponding to the currently detected SINR value, and determines a bandwidth part corresponding to the SINR interval as the bandwidth part of the sidelink channel.

If the influencing factor of the communications system parameter is the frequency offset value F of the sidelink channel, a possible value range of the frequency offset value of the sidelink channel may be divided into a plurality of intervals as follows: $[F_0$ to $F_1]$, $[F_1$ to $F_2]$, $[F_2$ to $F_3]$, ..., $[F_n$ to $F_{n+1}]$, and bandwidth parts sequentially corresponding to the frequency offset value intervals are $BWP_0$ to $BWP_N$, $BWP_{N+1}$ to $BWP_M$, $BWP_{M+1}$ to $BWP_V$, ..., $BWP_W$ to $BWP_Q$. In addition, if the frequency offset value of the sidelink channel is higher than $F_{n+1}$, a bandwidth part corresponding to the frequency offset value is determined as $BWP_X$ to $BWP_Y$. After detecting the frequency offset value of the sidelink channel, the receive-end device determines a frequency offset value interval corresponding to the currently detected frequency offset value, and determines a bandwidth part corresponding to the frequency offset value interval as the bandwidth part of the sidelink channel.

The foregoing lists specific implementation processes of determining the bandwidth part of the sidelink channel based on each influencing factor and the first mapping relationship between the influencing factor and the bandwidth part. After the bandwidth part of the sidelink channel is determined by performing the foregoing process, the foregoing step (2) is performed, and the SCS of the sidelink channel is determined based on the second mapping relationship between the bandwidth part of the sidelink channel and the SCS.

For ease of understanding, the following describes the foregoing process of determining the SCS of the sidelink channel by using the absolute moving speed of the transmit-end device as an example.

For example, for the absolute moving speed of the transmit-end device, a bandwidth part corresponding to a speed interval [0, 5] is $BWP_0$ to $BWP_5$, and an SCS used by the bandwidth part is 15 kHz; a bandwidth part corresponding to a speed interval [5+3, 20] is $BWP_6$ to $BWP_{15}$, and an SCS used by the bandwidth part is 15 kHz; a bandwidth part corresponding to a speed interval [20+5, 50] is $BWP_{16}$ to $BWP_{30}$, and an SCS used by the bandwidth part is 30 kHz; a bandwidth part corresponding to a speed interval [50+10, 90] is $BWP_{31}$ to $BWP_{45}$, and an SCS used by the bandwidth part is 60 kHz; a bandwidth part corresponding to a speed interval [90+15, 150] is $BWP_{46}$ to $BWP_{60}$, and an SCS used by the bandwidth part is 60 kHz; and the absolute moving speed of the transmit-end device in each speed interval is in units of km/h. When the absolute moving speed of the transmit-end device is greater than 150 km/h, a corresponding bandwidth part is $BWP_{61}$ to $BWP_{75}$, and an SCS used by the bandwidth part may be 120 kHz.

When the receive-end device needs to determine the communications system parameter of the sidelink channel, the receive-end device first detects a current absolute moving speed of the transmit-end device, then determines a speed interval in which the current absolute moving speed of the transmit-end device is located, then determines a bandwidth part corresponding to the speed interval as the bandwidth part of the sidelink channel, and finally determines an SCS used by the bandwidth part of the sidelink channel as the SCS of the sidelink channel.

For example, in a specific implementation, when it is currently detected that the absolute moving speed of the transmit-end device is 10 km/h, the current absolute moving speed of the transmit-end device falls within the speed interval [5+3, 20], where the bandwidth part corresponding to the speed interval [5+3, 20] is $BWP_6$ to $BWP_{15}$. Therefore, it may be determined that the bandwidth part corresponding to the sidelink channel is $BWP_6$ to $BWP_{15}$ in this case. Because the SCS used by the bandwidth part $BWP_6$ to $BWP_{15}$ is 15 kHz, it may be determined that the SCS of the sidelink channel is 15 kHz.

The foregoing describes in detail a specific implementation process of determining the communications system parameter of the sidelink channel by using one influencing factor. In addition, the communications system parameter of the sidelink channel may be further determined based on a combination of two or more influencing factors. For example, the communications system parameter of the sidelink channel may be determined based on two influencing factors: the absolute moving speed of the transmit-end device and the priority of the service currently being processed by the receive-end device; or the communications system parameter of the sidelink channel may be further determined based on two influencing factors: the priority of the service currently being processed by the receive-end device and the latency requirement of the service. Certainly, two or more other influencing factors may also be combined. This is an example for description only. A combination form of influencing factors is not limited to this.

In this embodiment of this disclosure, if the communications system parameter of the sidelink channel is determined based on a combination of two or more influencing factors, the combination of influencing factors may be considered in the process of determining the bandwidth part of the sidelink channel in the foregoing step (1). Especially, when bandwidth parts corresponding to different influencing factors are different, a bandwidth part corresponding to an influencing factor with a greater weight is determined as the bandwidth part of the sidelink channel.

For ease of understanding, a combination of two influencing factors, that is, the priority of the service currently being processed by the receive-end device and the latency requirement of the service, is hereinafter used as an example to describe how to determine the SCS of the sidelink channel based on two influencing factors. It is assumed that a weight of the priority of the service is A and that a weight of the latency requirement of the service is B.

For example, for the priority of the service, a bandwidth part corresponding to a service priority $P_1$ is $BWP_0$ to $BWP_5$, and an SCS used by the bandwidth part is 15 kHz; a bandwidth part corresponding to a service priority $P_2$ is $BWP_6$ and $BWP_{15}$, and an SCS used by the bandwidth part is 15 kHz; and a bandwidth part corresponding to a service priority $P_3$ is $BWP_{16}$ to $BWP_{30}$, and an SCS used by the bandwidth part is 30 kHz.

For the latency requirement of the service, a bandwidth part corresponding to a latency requirement interval [0, 10] is $BWP_{16}$ to $BWP_{30}$, and an SCS used by the bandwidth part is 30 kHz; a bandwidth part corresponding to a latency requirement interval [10, 30] is $BWP_6$ to $BWP_{15}$, and an SCS used by the bandwidth part is 15 kHz; a bandwidth part corresponding to a latency requirement interval [30, 100] is $BWP_0$ to $BWP_5$, and an SCS used by the bandwidth part is 15 kHz; and each latency requirement in the latency requirement interval is in units of milliseconds.

Assuming that the receive-end device detects that the priority of the service currently being processed by the receive-end device is $P_3$, and it is required that the latency requirement of the service should be in the interval [0, 10], and bandwidth parts corresponding to the two influencing factors are both $BWP_{16}$ to $BWP_{30}$, it may be determined that the bandwidth part of the sidelink channel is $BWP_{16}$ to $BWP_{30}$. However, assuming that the receive-end device detects that the priority of the service currently being processed is $P_2$, and the latency requirement of the service is in the interval [0, 10], for the priority of the service, a bandwidth part corresponding to $P_2$ is $BWP_6$ to $BWP_{15}$, and for the latency requirement of the service, a bandwidth part corresponding to the interval [0, 10] is $BWP_{16}$ to $BWP_{30}$. Because the bandwidth parts corresponding to the two influencing factors are different in this case, the bandwidth part of the sidelink channel needs to be determined based on weights corresponding to the two influencing factors. If the weight A of the priority of the service is greater than or equal to the weight B of the latency requirement of the service, it is determined that the bandwidth part of the sidelink channel is $BWP_6$ to $BWP_{15}$, and the SCS 15 kHz used by the bandwidth part $BWP_6$ to $BWP_{15}$ is determined as the SCS of the sidelink channel. If the weight A of the priority of the service is less than the weight of the latency requirement of the service, it is determined that the bandwidth part of the sidelink channel is $BWP_{16}$ to $BWP_{30}$, and the SCS 30 kHz used by the bandwidth part $BWP_{16}$ to $BWP_{30}$ is determined as the SCS of the sidelink channel.

The foregoing describes in detail the specific implementation process of determining the communications system parameter based on the mapping relationship between the influencing factor of the communications system parameter and the communications system parameter. In addition, a mapping relationship between each influencing factor and the SCS may also be directly established, and then the receive-end device determines the SCS based on the detected influencing factor and the mapping relationship.

Certainly, this embodiment of this disclosure describes only two specific implementation processes of determining the communications system parameter. However, a specific implementation of determining the communications system parameter based on the mapping relationship between the influencing factor of the communications system parameter and the communications system parameter is not limited to this.

Third manner: Determine the communications system parameter based on the obtained first indication information and the mapping relationship between the influencing factor of the communications system parameter and the communications system parameter.

In this embodiment of this disclosure, when the sidelink channel includes the physical sidelink control channel and the physical sidelink data channel, correspondingly, the communications system parameter includes the first communications system parameter and the second communications system parameter. Therefore, the first communications system parameter may be determined based on the obtained first indication information, and the second communications system parameter is determined based on the mapping relationship between the influencing factor of the communications system parameter and the communications system parameter; or the second communications system parameter is determined based on the obtained first indication information, and the first communications system parameter is determined based on the mapping relationship between the influencing factor of the communications system parameter and the communications system parameter.

Specifically, in this manner, the method for obtaining a communications system parameter includes at least the following several cases:

1. The first indication information is obtained from the network message transmitted by the network-side device, and the first communications system parameter is determined based on the first indication information; and the second communications system parameter is determined based on the influencing factor currently detected by the receive-end device and the mapping relationship between the influencing factor of the communications system parameter and the communications system parameter.

2. The first indication information is obtained from the network message transmitted by the network-side device, and the second communications system parameter is determined based on the first indication information; and the second communications system parameter is determined based on the influencing factor currently detected by the receive-end device and the mapping relationship between the influencing factor of the communications system parameter and the communications system parameter.

3. The first communications system parameter is determined based on the influencing factor current detected by the receive-end device and the mapping relationship between the influencing factor of the communications system parameter and the communications system parameter; and the first communications system parameter is used to decode the received SCI information transmitted by the transmit-end device by using the physical sidelink control channel, the first indication information is obtained from the decoded SCI information, and then the second communications system parameter is determined based on the first indication information.

According to the method for determining a communications system parameter in this embodiment of this disclosure, the receive-end device may determine the communications system parameter based on the obtained first indication information, and/or determine the communications system parameter based on the mapping relationship between the influencing factor of the communications system parameter and the communications system parameter. This prevents the receive-end device from searching for the communications system parameter in a blind detection mode. Therefore, workload of the receive-end device and complexity of decoding by the receive-end device can be reduced, and communication efficiency can be improved.

Figure 3:
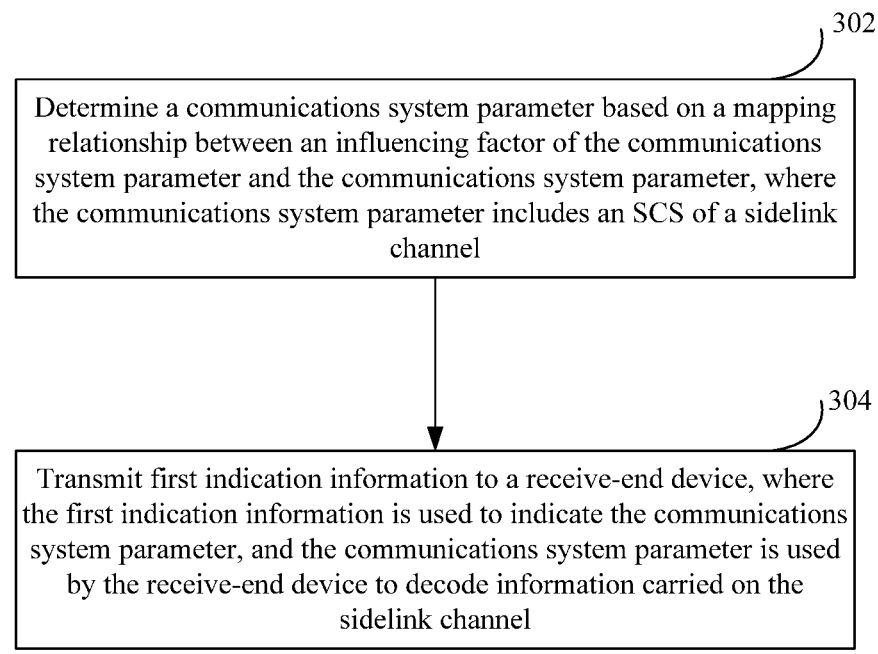
FIG. 3 is a flowchart of a method for indicating a communications system parameter according to an embodiment of this disclosure.

Corresponding to the foregoing embodiment, an embodiment of this disclosure further provides a method for indicating a communications system parameter, where the method is applied to a network-side device. In this embodiment of this disclosure, for detailed descriptions about parts same as those of the foregoing embodiment of the method for determining a communications system parameter, refer to content of the foregoing embodiment. Details are not described again in this embodiment. FIG. 3 is a flowchart of a method for indicating a communications system parameter according to an embodiment of this disclosure. The method shown in FIG. 3 includes at least steps 302 to 304.

Step 302: Determine a communications system parameter based on a mapping relationship between an influencing factor of the communications system parameter and the communications system parameter, where the communications system parameter includes an SCS of a sidelink channel.

Specifically, in step 302, determining a communications system parameter based on a mapping relationship between an influencing factor of the communications system parameter and the communications system parameter may include the following step 1, step 2, and step 3:

step 1: obtain the influencing factor of the communications system parameter;

step 2: determine a bandwidth part of the sidelink channel based on a first mapping relationship between the influencing factor and the bandwidth part of the sidelink channel; and step 3: determine the SCS of the sidelink channel based on a second mapping relationship between the bandwidth part of the sidelink channel and the SCS.

In this embodiment of this disclosure, a network-side device may detect the influencing factor of the communications system parameter based on a specified period or randomly, and then determine the communications system parameter based on a parameter value of the detected influencing factor and the mapping relationship between the influencing factor of the communications system parameter and the communications system parameter.

Specifically, the influencing factor includes at least one of the following: an absolute moving speed of a transmit-end device, an absolute moving speed of a receive-end device, a relative moving speed between the transmit-end device and the receive-end device, a related parameter of a service currently being transmitted on the sidelink channel, and a status measurement value of the sidelink channel.

The relative moving speed between the transmit-end device and the receive-end device includes the following two cases: a relative moving speed of the transmit-end device relative to the receive-end device, and a relative moving speed of the receive-end device relative to the transmit-end device.

Specifically, in this embodiment of this disclosure, the influencing factor of the communications system parameter may include one or more of the absolute moving speed of the transmit-end device, the absolute moving speed of the receive-end device, the relative moving speed between the transmit-end device and the receive-end device, the related parameter of the service currently being transmitted on the sidelink channel, and the status measurement value of the sidelink channel.

In this embodiment of this disclosure, the related parameter of the service includes at least one of the following:

a priority of the service, a latency requirement of the service, reliability of the service, a throughput requirement of the service, and a bandwidth occupied by the service; and the status measurement value of the sidelink channel includes at least one of the following:

a frequency offset value, an RSRP value, and an SINR value.

In this embodiment of this disclosure, the related parameter of the service may include one or more of the priority of the service, the latency requirement of the service, the reliability of the service, the throughput requirement of the service, and the bandwidth occupied by the service; and the status measurement value of the sidelink channel may include one or more of the frequency offset value, the RSRP value, and the SINR value.

In the foregoing embodiment of the method for determining a communications system parameter, how to determine the communications system parameter based on the mapping relationship between the influencing factor of the communications system parameter and the communications system parameter is already described in detail. Therefore, for a specific process, refer to the foregoing embodiment. The specific process of determining the communications system parameter is not described again herein.

In addition, in the foregoing step 302, the communications system parameter may further include a CP of the sidelink channel or the bandwidth part of the sidelink channel, in addition to the SCS of the sidelink channel.

In this embodiment of this disclosure, the communications system parameter includes a first communications system parameter for decoding information carried on a physical sidelink control channel, and/or a second communications system parameter for decoding information carried on a physical sidelink data channel.

In this embodiment of this disclosure, the sidelink channel may include only the physical sidelink control channel, or may include only the physical sidelink data channel, or may include both the physical sidelink control channel and the physical sidelink data channel.

Therefore, in this embodiment of this disclosure, if the sidelink channel includes only the physical sidelink control channel, correspondingly, the communications system parameter includes only the first communications system parameter; if the sidelink channel includes only the physical sidelink data channel, correspondingly, the communications system parameter includes only the second communications system parameter; or if the sidelink channel includes the physical sidelink control channel and the physical sidelink data channel, correspondingly, the communications system parameter includes the first communications system parameter and the second communications system parameter.

Step 304: Transmit first indication information to the receive-end device, where the first indication information is used to indicate the communications system parameter, and the communications system parameter is used by the receive-end device to decode information carried on the sidelink channel.

Specifically, in step 304, transmitting first indication information to the receive-end device may include:

transmitting a network message to the receive-end device, where the network message carries the first indication information, where the network message includes one of the following messages: SI information, an RRC message, or DCI information.

The first indication information may be carried in the SI information and transmitted to the receive-end device, or may be carried in the RRC message and transmitted to the receive-end device, or may be carried in the DCI information and transmitted to the receive-end device.

Certainly, the foregoing lists only three specific types of network messages. The network message may also be of other message types. The foregoing is an example for description only, and a specific type of network message is not limited to this.

In this embodiment of this disclosure, if the sidelink channel includes the physical sidelink control channel and the physical sidelink data channel, the method for determining a communications system parameter includes at least the following cases, which are hereinafter described by using specific embodiments.

Figure 4:
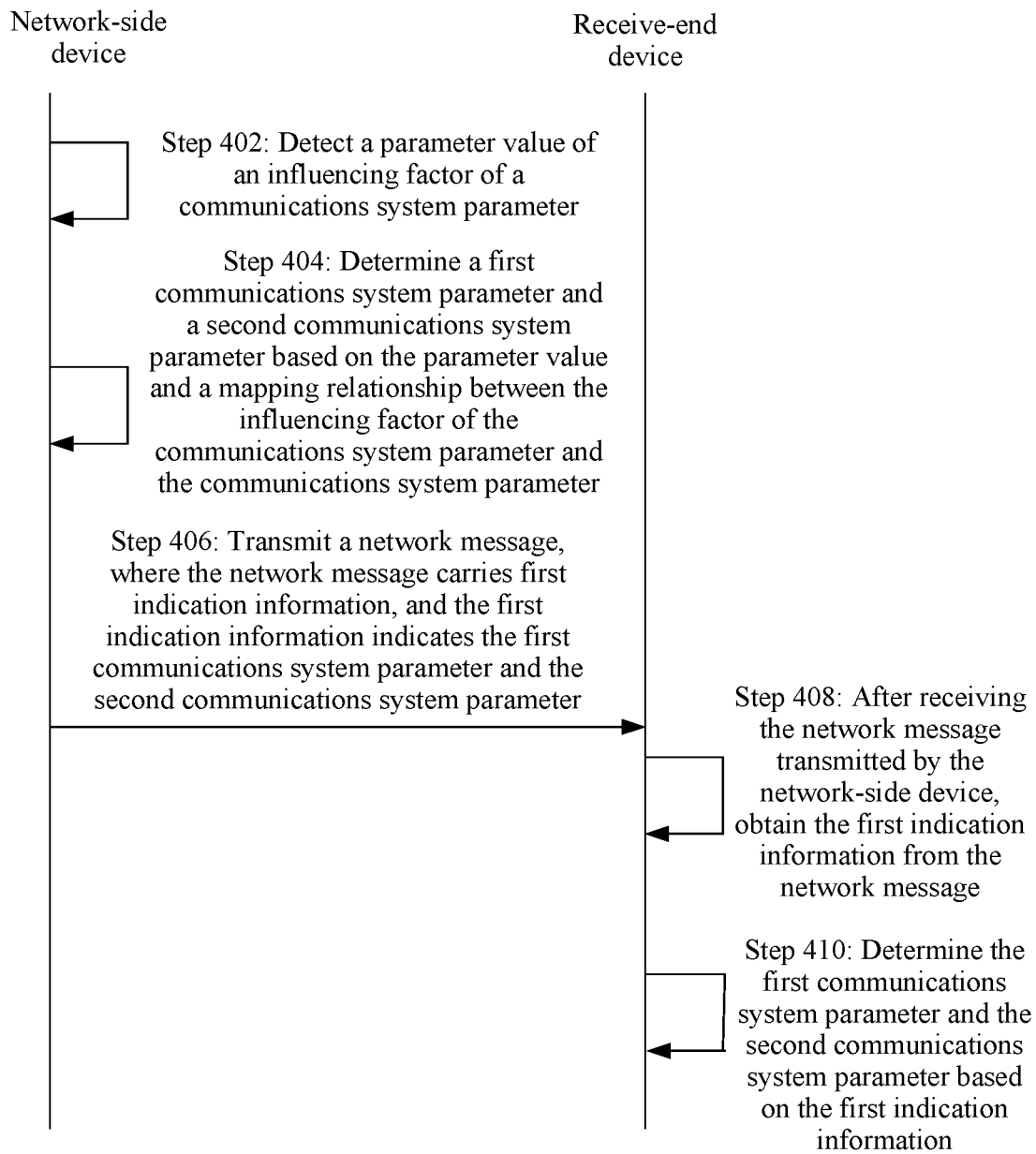
FIG. 4 is another flowchart of a method for determining a communications system parameter according to an embodiment of this disclosure.

FIG. 4 is a flowchart of a method for determining a communications system parameter according to an embodiment of this disclosure. The method shown in FIG. 4 includes at least the following steps.

Step 402: A network-side device detects a parameter value of an influencing factor of a communications system parameter.

Step 404: The network-side device determines a first communications system parameter and a second communications system parameter based on the parameter value and a mapping relationship between the influencing factor of the communications system parameter and the communications system parameter.

Step 406: The network-side device transmits a network message to a receive-end device, where the network message carries first indication information, and the first indication information indicates the first communications system parameter and the second communications system parameter.

Step 408: After receiving the network message transmitted by the network-side device, the receive-end device obtains the first indication information from the network message.

Step 410: The receive-end device determines the first communications system parameter and the second communications system parameter based on the first indication information.

After determining the first communications system parameter and the second communications system parameter, the receive-end device uses the first communications system parameter to decode information carried on a physical sidelink control channel, and uses the second communications system parameter to decode information carried on a physical sidelink data channel.

Figure 5:
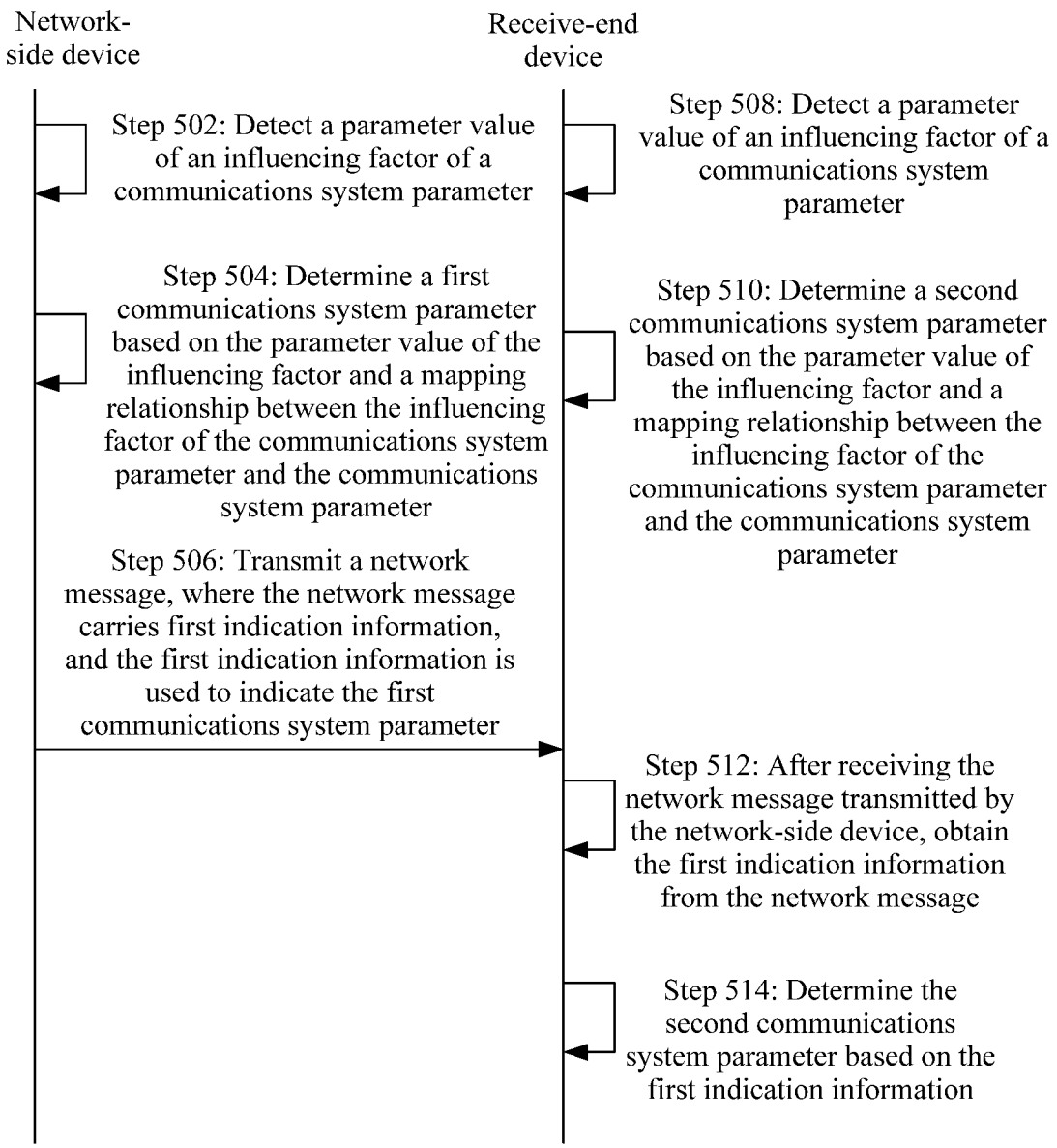
FIG. 5 is yet another flowchart of a method for determining a communications system parameter according to an embodiment of this disclosure.

FIG. 5 is a flowchart of a method for determining a communications system parameter according to an embodiment of this disclosure. The method shown in FIG. 5 includes at least the following steps.

Step 502: A network-side device detects a parameter value of an influencing factor of a communications system parameter.

Step 504: The network-side device determines a first communications system parameter based on the parameter value of the influencing factor and a mapping relationship between the influencing factor of the communications system parameter and the communications system parameter.

Step 506: The network-side device transmits a network message to a receive-end device, where the network message carries first indication information, and the first indication information is used to indicate the first communications system parameter.

Step 508: The receive-end device detects a parameter value of an influencing factor of a communications system parameter.

Step 510: The receive-end device determines a second communications system parameter based on the parameter value of the influencing factor and a mapping relationship between the influencing factor of the communications system parameter and the communications system parameter.

Step 512: After receiving the network message transmitted by the network-side device, the receive-end device obtains the first indication information from the network message.

Step 514: The receive-end device determines the first communications system parameter based on the first indication information.

In this embodiment, steps of determining the first communications system parameter and determining the second communications system parameter may be performed simultaneously, or may be performed in sequence. In this embodiment of this disclosure, the sequence of determining the first communications system parameter and determining the second communications system parameter is not limited.

After determining the first communications system parameter and the second communications system parameter, the receive-end device uses the first communications system parameter to decode information carried on a physical sidelink control channel, and uses the second communications system parameter to decode information carried on a physical sidelink data channel.

Certainly, in addition, the receive-end device may further determine the first communications system parameter based on the influencing factor of the communications system parameter and the communications system parameter, and determine the second communications system parameter based on the first indication information obtained from the network message.

For a specific implementation process of this embodiment of this disclosure, refer to the descriptions in the foregoing embodiment. Details are not described again herein.

According to the method for indicating a communications system parameter in this embodiment of this disclosure, the communications system parameter may be determined based on the mapping relationship between the influencing factor of the communications system parameter and the communications system parameter, and the first indication information indicating the communications system parameter of the sidelink channel is transmitted to the receive-end device. Therefore, the receive-end device may determine, directly based on the first indication information, the communications system parameter for decoding information carried on the sidelink channel. This avoids determining the communications system parameter in a blind detection mode. Therefore, workload of the receive-end device and complexity of decoding by the receive-end device are reduced, and communication efficiency is improved.

Figure 6:
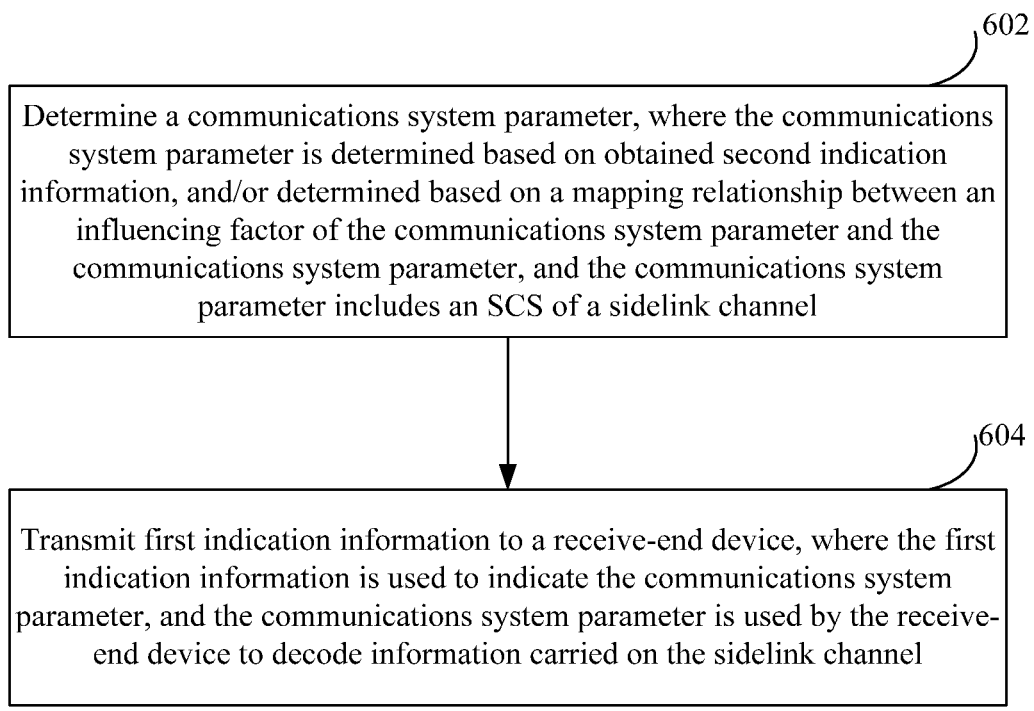
FIG. 6 is another flowchart of a method for indicating a communications system parameter according to an embodiment of this disclosure.

Corresponding to the foregoing embodiment, an embodiment of this disclosure further provides a method for indicating a communications system parameter, where the method is applied to a transmit-end device, and the transmit-end device is a terminal device that transmits information by using a sidelink channel. In this embodiment of this disclosure, for detailed descriptions about parts same as those of the foregoing embodiment of the method for determining a communications system parameter, refer to content of the foregoing embodiment. Details are not described again in this embodiment. FIG. 6 is a flowchart of a method for indicating a communications system parameter according to an embodiment of this disclosure. The method shown in FIG. 6 includes at least steps 602 to 604.

Step 602: Determine a communications system parameter, where the communications system parameter is determined based on obtained second indication information, and/or determined based on a mapping relationship between an influencing factor of the communications system parameter and the communications system parameter, and the communications system parameter includes an SCS of a sidelink channel.

The communications system parameter may further include a CP of the sidelink channel or a bandwidth part of the sidelink channel, in addition to the SCS of the sidelink channel.

In this embodiment of this disclosure, determining a communications system parameter in the foregoing step 602 includes at least the following three cases:

1. determining the communications system parameter based on the obtained second indication information;

2. determining the communications system parameter based on the mapping relationship between the influencing factor of the communications system parameter and the communications system parameter; and 3. determining the communications system parameter based on the obtained second indication information and the mapping relationship between the influencing factor of the communications system parameter and the communications system parameter.

Specifically, the second indication information is obtained from a network message transmitted by a network-side device.

The network message may be any one of SI information, an RRC message, DCI information. For example, the network-side device periodically or aperiodically detects each influencing factor of the communications system parameter, and determines the communications system parameter based on each detected influencing factor and a mapping relationship between the influencing factor and the communications system parameter; and then the indication information indicating the communications system parameter is carried in the SI information, the RRC message, or the DCI information, and transmitted to a transmit-end device.

The foregoing lists only three possible specific types of network messages. In addition, the network message may also be of other message types. This is an example for description only, and does not constitute a limitation on a specific type of network message.

Specifically, in step 602, determining the communications system parameter based on a mapping relationship between an influencing factor of the communications system parameter and the communications system parameter includes at least the following step 1, step 2, and step 3:

step 1: obtain the influencing factor of the communications system parameter;

step 2: determine the bandwidth part of the sidelink channel based on a first mapping relationship between the influencing factor and the bandwidth part of the sidelink channel; and step 3: determine the SCS of the sidelink channel based on a second mapping relationship between the bandwidth part of the sidelink channel and the SCS.

In this embodiment of this disclosure, the transmit-end device may detect a parameter value of the influencing factor of the communications system parameter based on a specified period or randomly, and then determine the communications system parameter based on the detected parameter value and the mapping relationship between the influencing factor of the communications system parameter and the communications system parameter.

In addition, in this embodiment of this disclosure, after determining the communications system parameter, the transmit-end device transmits information to a receive-end device based on the communications system parameter by using the sidelink channel.

Specifically, the influencing factor includes at least one of the following:

an absolute moving speed of the transmit-end device, an absolute moving speed of the receive-end device, a relative moving speed between the transmit-end device and the receive-end device, a related parameter of a service currently being transmitted on the sidelink channel, and a status measurement value of the sidelink channel.

The relative moving speed between the transmit-end device and the receive-end device includes the following two cases: a relative moving speed of the transmit-end device relative to the receive-end device, and a relative moving speed of the receive-end device relative to the transmit-end device.

Specifically, in this embodiment of this disclosure, the influencing factor of the communications system parameter may include one or more of the absolute moving speed of the transmit-end device, the absolute moving speed of the receive-end device, the relative moving speed between the transmit-end device and the receive-end device, the related parameter of the service currently being transmitted on the sidelink channel, and the status measurement value of the sidelink channel.

In this embodiment of this disclosure, the related parameter of the service includes at least one of the following:

a priority of the service, a latency requirement of the service, reliability of the service, a throughput requirement of the service, and a bandwidth occupied by the service; and the status measurement value of the sidelink channel includes at least one of the following:

a frequency offset value, an RSRP value, and an SINR value.

In this embodiment of this disclosure, the related parameter of the service may include one or more of the priority of the service, the latency requirement of the service, the reliability of the service, the throughput requirement of the service, and the bandwidth occupied by the service; and the status measurement value of the sidelink channel may include one or more of the frequency offset value, the RSRP value, and the SINR value.

In the foregoing embodiment of the method for determining a communications system parameter, how to determine the communications system parameter based on the mapping relationship between the influencing factor of the communications system parameter and the communications system parameter is already described in detail. Therefore, for a specific process, refer to the foregoing embodiment. The specific process of determining the communications system parameter is not described again herein.

Step 604: Transmit first indication information to the receive-end device, where the first indication information is used to indicate the communications system parameter, and the communications system parameter is used by the receive-end device to decode information carried on the sidelink channel.

In this embodiment of this disclosure, the communications system parameter includes a first communications system parameter for decoding information carried on a physical sidelink control channel, and/or a second communications system parameter for decoding information carried on a physical sidelink data channel.

Specifically, if the sidelink channel includes only the physical sidelink control channel, correspondingly, the communications system parameter includes only the first communications system parameter; if the sidelink channel includes only the physical sidelink data channel, correspondingly, the communications system parameter includes only the second communications system parameter; or if the sidelink channel includes the physical sidelink control channel and the physical sidelink data channel, correspondingly, the communications system parameter includes the first communications system parameter and the second communications system parameter.

In this embodiment of this disclosure, if the sidelink channel includes the physical sidelink control channel and the physical sidelink data channel, determining a communications system parameter in step 602 includes determining the first communications system parameter and the second communications system parameter. A specific determining process includes at least the following four cases:

Case A: The network-side device transmits a network message to the transmit-end device, where the network message carries the second indication information indicating the first communications system parameter and the second communications system parameter; and the transmit-end device obtains the second indication information from the received network message, and determines the first communications system parameter and the second communications system parameter based on the second indication information.

Case B: The transmit-end device periodically or aperiodically detects the parameter value of each influencing factor of the communications system parameter, and then determines the first communications system parameter and the second communications system parameter based on the detected parameter value and the mapping relationship between the influencing factor and the communications system parameter.

Case C: The network-side device transmits a network message to the transmit-end device, where the network message carries the second indication information indicating the first communications system parameter; the transmit-end device obtains the second indication information from the received network message, and determines the first communications system parameter based on the second indication information; in addition, the transmit-end device periodically or aperiodically detects the parameter value of each influencing factor of the communications system parameter, and then determines the second communications system parameter based on the detected parameter value and the mapping relationship between the influencing factor and the communications system parameter.

Case D: The network-side device transmits a network message to the transmit-end device, where the network message carries the second indication information indicating the second communications system parameter; the transmit-end device obtains the second indication information from the received network message, and determines the second communications system parameter based on the second indication information; in addition, the transmit-end device periodically or aperiodically detects the parameter value of each influencing factor of the communications system parameter, and then determines the first communications system parameter based on the detected parameter value and the mapping relationship between the influencing factor and the communications system parameter.

In a specific implementation, in step 604, transmitting first indication information to the receive-end device may be transmitting, to the receive-end device, the first indication information indicating the second communications system parameter, and specifically includes:

transmitting SCI information to the receive-end device, where the SCI information carries the first indication information, and the first indication information is used to indicate the second communications system parameter.

In this embodiment of this disclosure, the SCI information is transmitted to the receive-end device by using the physical sidelink control channel. Therefore, after receiving the SCI information transmitted by the transmit-end device, the receive-end device first needs to decode the information carried on the physical sidelink control channel, then obtain the first indication information from the decoded SCI information, determine the second communications system parameter based on the first indication information, and use the second communications system parameter to decode the information carried on the physical sidelink data channel.

Therefore, in the foregoing case, the receive-end device first needs to determine the first communications system parameter, where the first communications system parameter may be determined based on the mapping relationship between the influencing factor of the communications system parameter and the communications system parameter, or may be determined based on the first indication information obtained from the network-side device. Details are hereinafter described with reference to specific embodiments.

Figure 7:
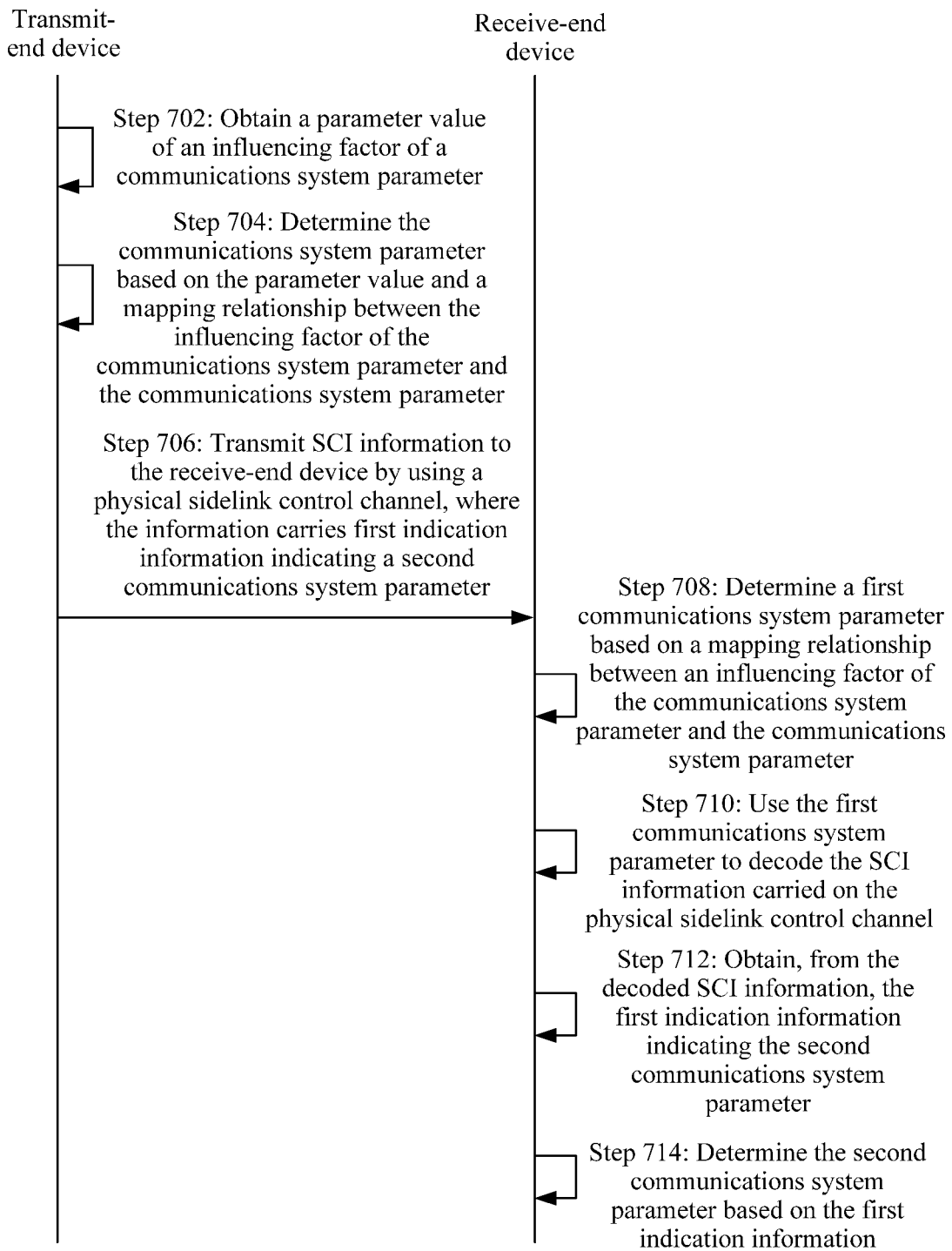
FIG. 7 is still another flowchart of a method for determining a communications system parameter according to an embodiment of this disclosure.

FIG. 7 is a flowchart of a method for determining a communications system parameter according to an embodiment of this disclosure. The method is performed by a transmit-end device and a receive-end device jointly. The method shown in FIG. 7 includes at least the following steps.

Step 702: A transmit-end device obtains a parameter value of an influencing factor of a communications system parameter.

Step 704: The transmit-end device determines the communications system parameter based on the parameter value and a mapping relationship between the influencing factor of the communications system parameter and the communications system parameter.

The communications system parameter determined in step 704 includes a first communications system parameter and a second communications system parameter.

Step 706: The transmit-end device transmits SCI information to a receive-end device by using a physical sidelink control channel, where the information carries first indication information indicating the second communications system parameter.

Step 708: The receive-end device determines the first communications system parameter based on a mapping relationship between an influencing factor of the communications system parameter and the communications system parameter.

Step 710: The receive-end device uses the first communications system parameter to decode the SCI information carried on the physical sidelink control channel.

Step 712: The receive-end device obtains, from the decoded SCI information, the first indication information indicating the second communications system parameter.

Step 714: The receive-end device determines the second communications system parameter based on the first indication information.

After determining the second communications system parameter, the receive-end device uses the second communications system parameter to decode information carried on a physical sidelink data channel.

Figure 8:
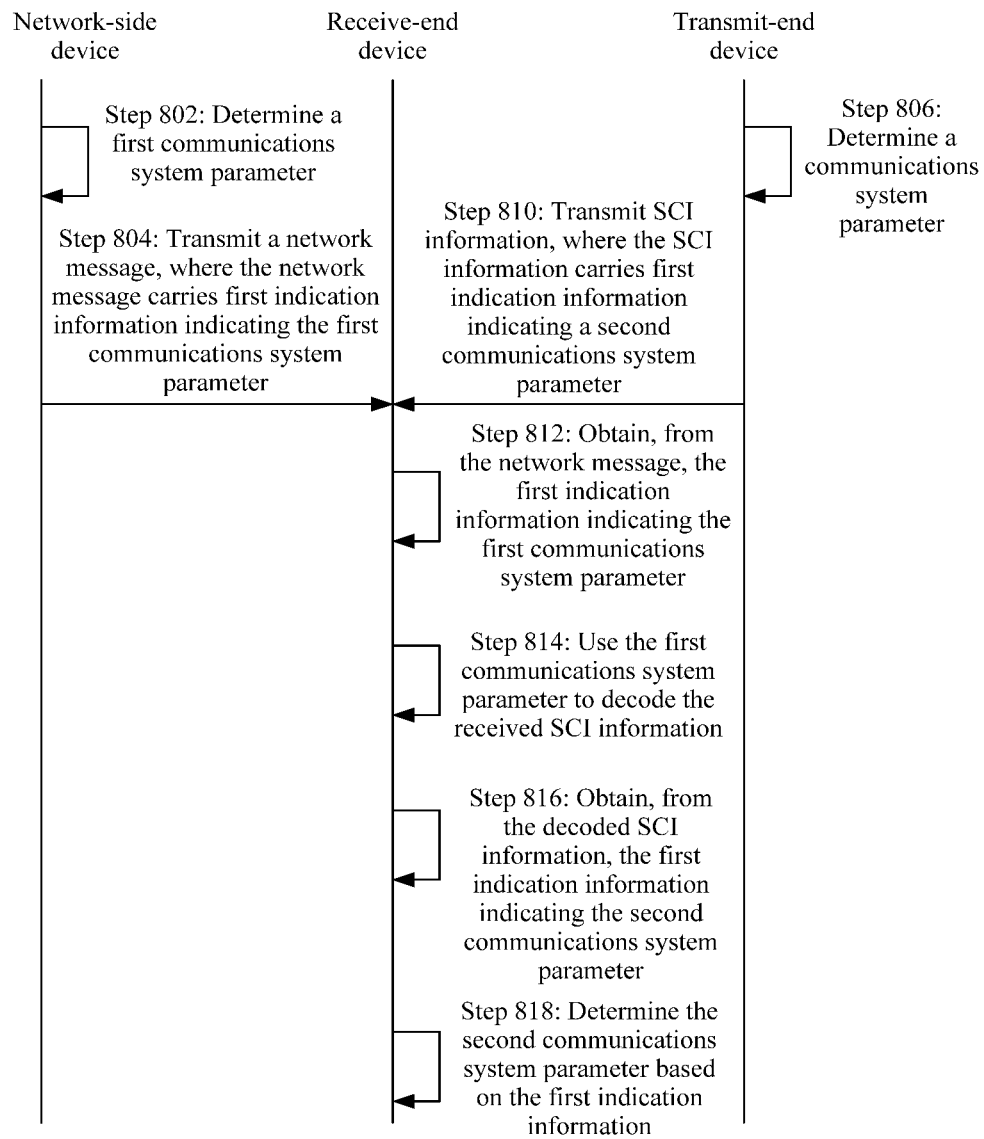
FIG. 8 is still another flowchart of a method for determining a communications system parameter according to an embodiment of this disclosure.

FIG. 8 is a flowchart of a method for determining a communications system parameter according to an embodiment of this disclosure. The method is performed by a network-side device, a transmit-end device, and a receive-end device jointly. The method shown in FIG. 8 includes at least the following steps.

Step 802: A network-side device determines a first communications system parameter.

In step 802, the network-side device determines the first communications system parameter based on a mapping relationship between an influencing factor of a communications system parameter and the communications system parameter.

Step 804: The network-side device transmits a network message to a receive-end device, where the network message carries first indication information indicating the first communications system parameter.

Step 806: A transmit-end device determines a communications system parameter.

In step 806, the transmit-end device determines the communications system parameter based on a mapping relationship between an influencing factor of the communications system parameter and the communications system parameter, and the communications system parameter determined by the transmit-end device includes a first communications system parameter and a second communications system parameter.

Step 810: The transmit-end device transmits SCI information to the receive-end device, where the SCI information carries first indication information indicating the second communications system parameter.

In step 810, the transmit-end device encodes the SCI information based on the first communications system parameter, and then transmits the encoded SCI information to the receive-end device by using a physical sidelink control channel.

Step 812: After receiving the network message transmitted by the network-side device, the receive-end device obtains, from the network message, the first indication information indicating the first communications system parameter.

Step 814: The receive-end device uses the first communications system parameter to decode the received SCI information.

Step 816: The receive-end device obtains, from the decoded SCI information, the first indication information indicating the second communications system parameter.

Step 818: The receive-end device determines the second communications system parameter based on the first indication information.

In this embodiment, the network-side device transmits the network message carrying the first indication information to the receive-end device, and the transmit-end device transmits the SCI information carrying the first indication information to the receive-end device. The two processes may be performed simultaneously, or may be performed in sequence. The sequence of the two processes is not limited in this embodiment of this disclosure.

According to the method for indicating a communications system parameter in this embodiment of this disclosure, the communications system parameter may be determined based on the mapping relationship between the influencing factor of the communications system parameter and the communications system parameter, and the first indication information indicating the communications system parameter of the sidelink channel is transmitted to the receive-end device. Therefore, the receive-end device may determine, directly based on the first indication information, the communications system parameter for decoding information carried on the sidelink channel. This avoids determining the communications system parameter in a blind detection mode. Therefore, workload of the receive-end device and complexity of decoding by the receive-end device are reduced, and communication efficiency is improved.

Corresponding to the method for determining a communications system parameter according to the foregoing embodiment, an embodiment of this disclosure provides a receive-end device. The receive-end device provided in this embodiment of this disclosure can implement each process implemented by the receive-end device in the foregoing embodiment.

Figure 9:
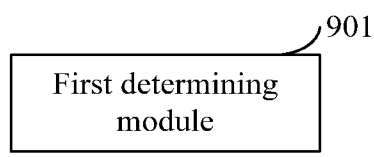
FIG. 9 is a schematic diagram of modular composition of a receive-end device according to an embodiment of this disclosure.

FIG. 9 is a schematic diagram of modular composition of a receive-end device according to an embodiment of this disclosure. The device shown in FIG. 9 includes:

a first determining module 901, configured to determine a communications system parameter based on obtained first indication information, and/or determine a communications system parameter based on a mapping relationship between an influencing factor of the communications system parameter and the communications system parameter, where the communications system parameter includes an SCS of a sidelink channel, and the communications system parameter is used to decode information carried on the sidelink channel.

Optionally, the communications system parameter further includes a CP of the sidelink channel or a bandwidth part of the sidelink channel.

Optionally, the communications system parameter includes a first communications system parameter for decoding information carried on a physical sidelink control channel, and/or a second communications system parameter for decoding information carried on a physical sidelink data channel.

Optionally, if the first indication information indicates the first communications system parameter, correspondingly, the first indication information is obtained from a network message transmitted by a network-side device.

Optionally, if the first indication information indicates the second communications system parameter, the first indication information is obtained in either of the following manners:

obtaining from a network message transmitted by a network-side device; and obtaining from information that is obtained by decoding sidelink control information SCI on the physical sidelink control channel based on the first communications system parameter.

Optionally, the network message includes one of the following messages:

SI information, an RRC message, or DCI information.

Optionally, the first determining module 901 is specifically configured to:

determine a bandwidth part of the sidelink channel based on a first mapping relationship between the influencing factor of the communications system parameter and the bandwidth part; and determine the SCS of the sidelink channel based on a second mapping relationship between the bandwidth part of the sidelink channel and the SCS.

Optionally, the influencing factor includes at least one of the following:

an absolute moving speed of a transmit-end device, an absolute moving speed of the receive-end device, a relative moving speed between the transmit-end device and the receive-end device, a related parameter of a service currently being processed by the receive-end device, and a status measurement value of the sidelink channel.

Optionally, the related parameter of the service includes at least one of the following:

a priority of the service, a latency requirement of the service, reliability of the service, a throughput requirement of the service, and a bandwidth occupied by the service; and the status measurement value of the sidelink channel includes at least one of the following:

a frequency offset value, an RSRP value, and an SINR value.

The receive-end device provided in this embodiment of this disclosure may determine the communications system parameter based on the obtained first indication information, and/or determine the communications system parameter based on the mapping relationship between the influencing factor of the communications system parameter and the communications system parameter. This prevents the receive-end device from searching for the communications system parameter in a blind detection mode. Therefore, workload of the receive-end device and complexity of decoding by the receive-end device can be reduced, and communication efficiency can be improved.

Corresponding to the method for indicating a communications system parameter according to the foregoing embodiment, an embodiment of this disclosure provides a network-side device. The network-side device provided in this embodiment of this disclosure can implement each process implemented by the network-side device in the foregoing embodiment.

Figure 10:
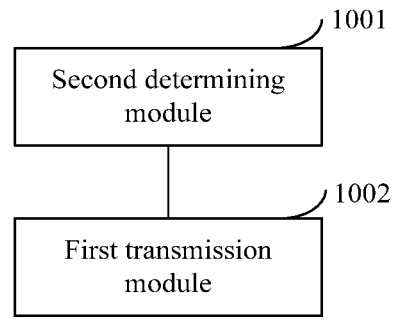
FIG. 10 is a schematic diagram of modular composition of a network-side device according to an embodiment of this disclosure.

FIG. 10 is a schematic diagram of modular composition of a network-side device according to an embodiment of this disclosure. The network-side device shown in FIG. 10 includes:

a second determining module 1001, configured to determine a communications system parameter based on a mapping relationship between an influencing factor of the communications system parameter and the communications system parameter, where the communications system parameter includes an SCS of a sidelink channel; and a first transmission module 1002, configured to transmit first indication information to a receive-end device, where the first indication information is used to indicate the communications system parameter, and the communications system parameter is used by the receive-end device to decode information carried on the sidelink channel.

Optionally, the communications system parameter further includes a CP of the sidelink channel or a bandwidth part of the sidelink channel.

Optionally, the communications system parameter includes a first communications system parameter for decoding information carried on a physical sidelink control channel, and/or a second communications system parameter for decoding information carried on a physical sidelink data channel.

Optionally, the second determining module 1001 is specifically configured to:

obtain the influencing factor of the communications system parameter, determine a bandwidth part of the sidelink channel based on a first mapping relationship between the influencing factor and the bandwidth part of the sidelink channel, and determine the SCS of the sidelink channel based on a second mapping relationship between the bandwidth part of the sidelink channel and the SCS.

Optionally, the influencing factor includes at least one of the following:

an absolute moving speed of a transmit-end device, an absolute moving speed of the receive-end device, a relative moving speed between the transmit-end device and the receive-end device, a related parameter of a service currently being transmitted on the sidelink channel, and a status measurement value of the sidelink channel.

Optionally, the related parameter of the service includes at least one of the following:

a priority of the service, a latency requirement of the service, reliability of the service, a throughput requirement of the service, and a bandwidth occupied by the service; and the status measurement value of the sidelink channel includes at least one of the following:

a frequency offset value, an RSRP value, and an SINR value.

Optionally, the first transmission module 1002 is specifically configured to:

transmit a network message to the receive-end device, where the network message carries the first indication information, where the network message includes one of the following messages: SI information, an RRC message, or DCI.

The network-side device provided in this embodiment of this disclosure may determine the communications system parameter based on the mapping relationship between the influencing factor of the communications system parameter and the communications system parameter, and transmit the first indication information indicating the communications system parameter of the sidelink channel to the receive-end device. Therefore, the receive-end device can determine, directly based on the first indication information, the communications system parameter for decoding the information carried on the sidelink channel. This avoids determining the communications system parameter in a blind detection mode. Therefore, workload of the receive-end device and complexity of decoding by the receive-end device are reduced, and communication efficiency is improved.

Corresponding to the method for indicating a communications system parameter according to the foregoing embodiment, an embodiment of this disclosure provides a transmit-end device. The transmit-end device provided in this embodiment of this disclosure can implement each process implemented by the transmit-end device in the foregoing embodiment.

Figure 11:
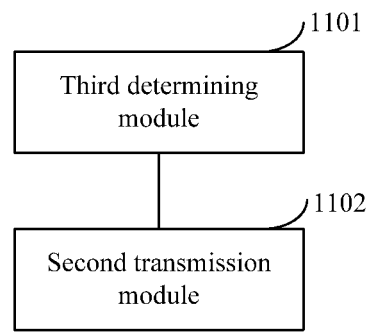
FIG. 11 is a schematic diagram of modular composition of a transmit-end device according to an embodiment of this disclosure.

FIG. 11 is a schematic diagram of modular composition of a transmit-end device according to an embodiment of this disclosure. The transmit-end device shown in FIG. 11 includes:

a third determining module 1101, configured to determine a communications system parameter, where the communications system parameter is determined based on obtained second indication information, and/or determined based on a mapping relationship between an influencing factor of the communications system parameter and the communications system parameter, and the communications system parameter includes an SCS of a sidelink channel; and a second transmission module 1102, configured to transmit first indication information to a receive-end device, where the first indication information is used to indicate the communications system parameter, and the communications system parameter is used by the receive-end device to decode information carried on the sidelink channel.

Optionally, the communications system parameter further includes a CP of the sidelink channel or a bandwidth part of the sidelink channel.

Optionally, the communications system parameter includes a first communications system parameter for decoding information carried on a physical sidelink control channel, and/or a second communications system parameter for decoding information carried on a physical sidelink data channel.

Optionally, the second transmission module 1102 is specifically configured to:

transmit sidelink control information SCI to the receive-end device, where the SCI carries the first indication information, and the first indication information is used to indicate the second communications system parameter.

Optionally, the third determining module 1101 is specifically configured to:

obtain the influencing factor of the communications system parameter, determine a bandwidth part of the sidelink channel based on a first mapping relationship between the influencing factor and the bandwidth part of the sidelink channel, and determine the SCS of the sidelink channel based on a second mapping relationship between the bandwidth part of the sidelink channel and the SCS.

Optionally, the influencing factor includes at least one of the following:

an absolute moving speed of the transmit-end device, an absolute moving speed of the receive-end device, a relative moving speed between the transmit-end device and the receive-end device, a related parameter of a service currently being transmitted on the sidelink channel, and a status measurement value of the sidelink channel.

Optionally, the related parameter of the service includes at least one of the following:

a priority of the service, a latency requirement of the service, reliability of the service, a throughput requirement of the service, and a bandwidth occupied by the service; and the status measurement value of the sidelink channel includes at least one of the following:

a frequency offset value, an RSRP value, and an SINK value.

Optionally, the second indication information is obtained from a network message transmitted by a network-side device.

The transmit-end device provided in this embodiment of this disclosure may determine the communications system parameter based on the mapping relationship between the influencing factor of the communications system parameter and the communications system parameter, and transmit the first indication information indicating the communications system parameter of the sidelink channel to the receive-end device. Therefore, the receive-end device can determine, directly based on the first indication information, the communications system parameter for decoding the information carried on the sidelink channel. This avoids determining the communications system parameter in a blind detection mode. Therefore, workload of the receive-end device and complexity of decoding by the receive-end device are reduced, and communication efficiency is improved.

Corresponding to the method for determining a communications system parameter according to the foregoing embodiment, this embodiment provides a receive-end device. The receive-end device provided in this embodiment of this disclosure can implement each process implemented by the receive-end device in the foregoing embodiment.

Figure 12:
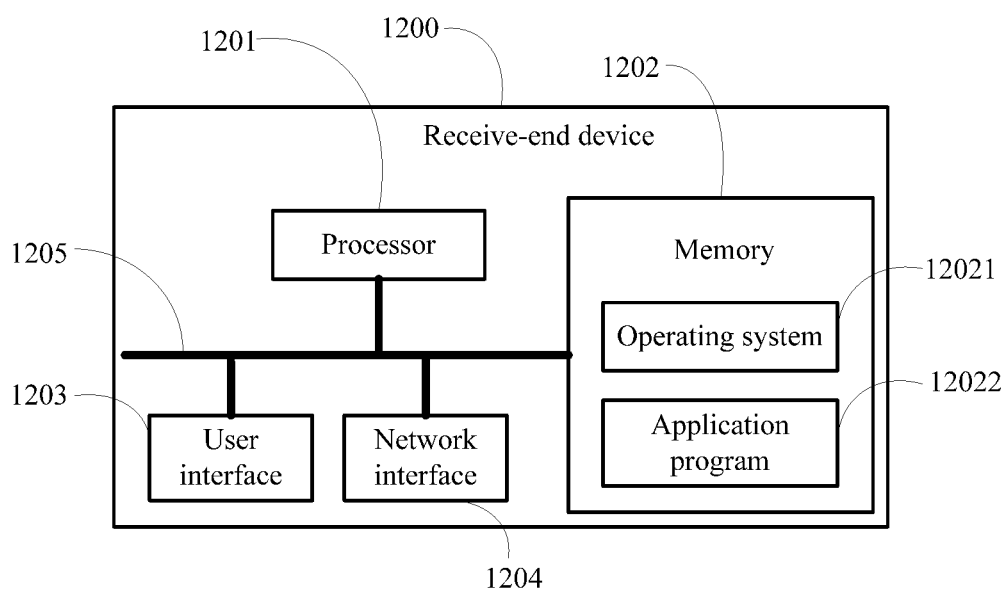
FIG. 12 is a schematic structural diagram of a receive-end device according to an embodiment of this disclosure.

FIG. 12 is a schematic structural diagram of a receive-end device according to an embodiment of this disclosure. As shown in FIG. 12, the receive-end device 1200 includes at least one processor 1201, a memory 1202, at least one network interface 1204, and a user interface 1203. All components of the receive-end device 1200 are coupled by a bus system 1205. It may be understood that the bus system 1205 is configured to implement connections and communication between the components. The bus system 1205 may further include a power bus, a control bus, and a status signal bus, in addition to a data bus. However, for clear description, various buses in FIG. 12 are marked as the bus system 1205.

The user interface 1203 may include display, a keyboard, or a pointing device (for example, a mouse, a trackball, a touch panel, or a touchscreen).

It may be understood that the memory 1202 in this embodiment of this disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. For example but not for limitation, a plurality of forms of RAMs such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DRRAM) may be used. The memory 1202 in the system and method described in this embodiment of this disclosure is intended to include but is not limited to these and any other appropriate types of memories.

In some implementations, the memory 1202 stores the following elements, executable modules or data structures, or a subset thereof, or an extended set thereof: an operating system 12021 and an application program 12022.

The operating system 12021 includes various system programs, for example, a framework layer, a kernel library layer, and a driver layer, for implementing various basic services and processing hardware-based tasks. The application program 12022 includes various application programs, for example, a media player and a browser, which are used to implement various application services. A program for implementing the method in this embodiment of this disclosure may be included in the application program 12022.

In this embodiment of this disclosure, the receive-end device 1200 further includes the memory 1202, the processor 1201, and a computer program that is stored in the memory 1202 and capable of running by the processor 1201. When the computer program is executed by the processor 1201, the following step is implemented:

determining a communications system parameter based on obtained first indication information, and/or determining a communications system parameter based on a mapping relationship between an influencing factor of the communications system parameter and the communications system parameter, where the communications system parameter includes an SCS of a sidelink channel, and the communications system parameter is used to decode information carried on the sidelink channel.

The method disclosed in the foregoing embodiment of this disclosure may be applied to the processor 1201 or implemented by the processor 1201. The processor 1201 may be an integrated circuit chip and has a signal processing capability. During implementation, each step of the foregoing method can be completed by hardware integrated logic circuits in the processor 1201 or instructions in the form of software. The processor 1201 may be a general processor, a Digital Signal Processor (DSP), an Application-Specific Integrated Circuit (ASIC), a Field Programmable Gate Array (FPGA), another programmable logic device, a discrete gate, a transistor logic device, or a discrete hardware component. All the methods, steps, and logical block diagrams disclosed in the embodiments of this disclosure can be implemented or performed by the processor. The general-purpose processor may be a microprocessor, or the processor may be any conventional processor or the like. The steps of the methods disclosed in the embodiments of this disclosure may be directly executed and completed by a hardware decoding processor, or may be executed and completed by a combination of hardware in a decoding processor and software modules. A software module may be located in a computer-readable storage medium mature in the art, such as a random access memory, a flash memory, a read-only memory, a programmable read-only memory, an electrically erasable programmable memory, a register, or the like. The computer-readable storage medium is located in the memory 1202. The processor 1201 fetches information in the memory 1202 and completes the steps of the foregoing methods in combination with hardware of the processor. Specifically, the computer-readable storage medium stores a computer program, and when the computer program is executed by the processor 1201, the steps in the foregoing embodiment are implemented.

It may be understood that these embodiments described in the embodiments of this disclosure may be implemented by hardware, software, firmware, middleware, micro code, or a combination thereof. For hardware implementation, a processing unit may be implemented in one or more ASICs, a DSP, a DSP Device (DSPD), a Programmable Logic Device (PLD), an FPGA, a general-purpose processor, a controller, a micro controller, other electronic units used to perform functions described in this disclosure, or a combination thereof.

For software implementation, the technology described in the embodiments of this disclosure may be implemented by using modules (for example, procedures or functions) that perform the functions in the embodiments of this disclosure. Software code may be stored in the memory and executed by the processor. The memory may be implemented inside the processor or outside the processor.

The receive-end device provided in this embodiment of this disclosure may determine the communications system parameter based on the obtained first indication information, and/or determine the communications system parameter based on the mapping relationship between the influencing factor of the communications system parameter and the communications system parameter. This prevents the receive-end device from searching for the communications system parameter in a blind detection mode. Therefore, workload of the receive-end device and complexity of decoding by the receive-end device can be reduced, and communication efficiency can be improved.

Corresponding to the method for indicating a communications system parameter according to the foregoing embodiment, this embodiment provides a network-side device. The network-side device provided in this embodiment of this disclosure can implement each process implemented by the network-side device in the foregoing embodiment.

Figure 13:
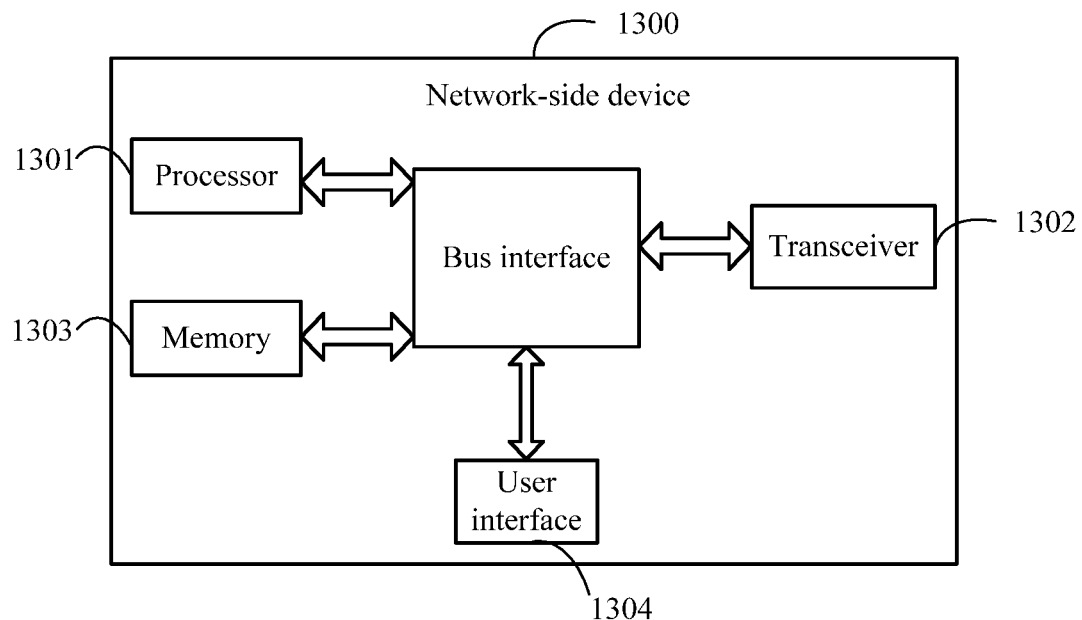
FIG. 13 is a schematic structural diagram of a network-side device according to an embodiment of this disclosure.

FIG. 13 is a schematic structural diagram of a network-side device according to an embodiment of this disclosure. As shown in FIG. 13, the network-side device 1300 includes a processor 1301, a transceiver 1302, a memory 1303, a user interface 1304, and a bus interface.

In this embodiment of this disclosure, the network-side device 1300 further includes a computer program that is stored in the memory 1303 and capable of running by the processor 1301. When the computer program is executed by the processor 1301, the following steps are implemented:

determining a communications system parameter based on a mapping relationship between an influencing factor of the communications system parameter and the communications system parameter, where the communications system parameter includes an SCS of a sidelink channel; and transmitting first indication information to a receive-end device, where the first indication information is used to indicate the communications system parameter, and the communications system parameter is used by the receive-end device to decode information carried on the sidelink channel.

In FIG. 13, a bus architecture may include any quantity of interconnect buses and bridges, specifically for interconnecting various circuits of one or more processors represented by the processor 1301 and a memory represented by the memory 1303. The bus architecture may further interconnect various other circuits such as a peripheral device, a voltage regulator, and a power management circuit. These are all well known in the art, and therefore are not further described in this specification. The bus interface provides an interface. The transceiver 1302 may be a plurality of components, that is, the transceiver 1302 includes a transmitter and a receiver, and provides a unit for communicating with various other apparatuses on a transmission medium. For different user equipment, the user interface 1304 may also be an interface for externally or internally connecting a required device, and the connected device includes but is not limited to a mini keyboard, a display, a speaker, a microphone, a joystick, or the like.

The processor 1301 is responsible for bus architecture management and general processing. The memory 1303 may store data used when the processor 1301 performs an operation.

When the computer program is executed by the processor 1301, steps in the foregoing embodiment are implemented.

The network-side device provided in this embodiment of this disclosure may determine the communications system parameter based on the mapping relationship between the influencing factor of the communications system parameter and the communications system parameter, and transmit the first indication information indicating the communications system parameter of the sidelink channel to the receive-end device. Therefore, the receive-end device can determine, directly based on the first indication information, the communications system parameter for decoding the information carried on the sidelink channel. This avoids determining the communications system parameter in a blind detection mode. Therefore, workload of the receive-end device and complexity of decoding by the receive-end device are reduced, and communication efficiency is improved.

The network-side device 1300 can implement each process implemented by the network-side device in the foregoing embodiment, and achieve a same technical effect. Details are not described again herein to avoid repetition.

Corresponding to the method for indicating a communications system parameter according to the foregoing embodiment, this embodiment provides a transmit-end device. The transmit-end device provided in this embodiment of this disclosure can implement each process implemented by the transmit-end device in the foregoing embodiment.

Figure 14:
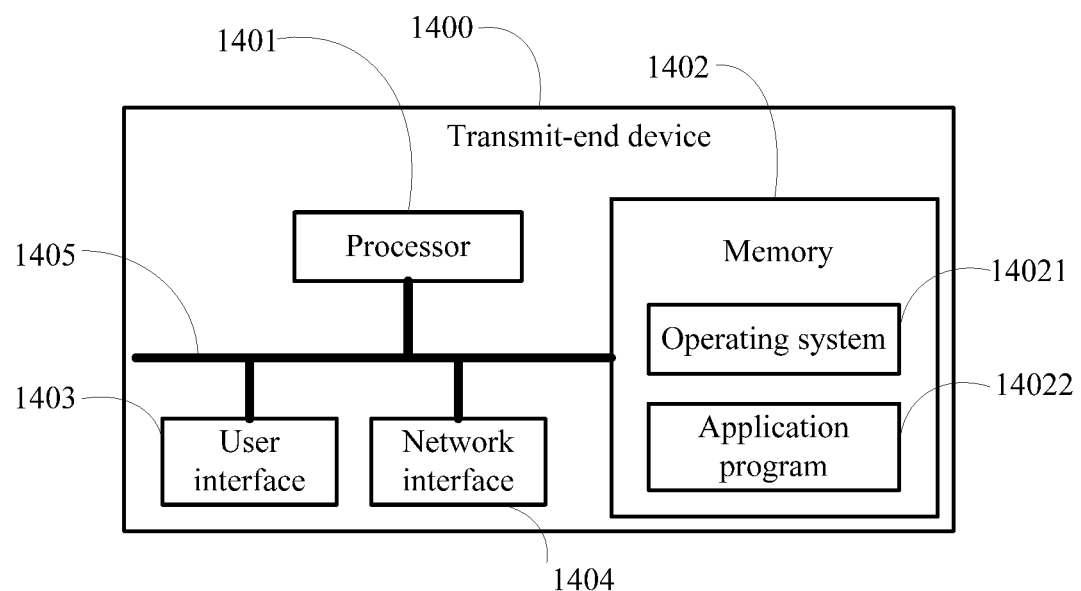
FIG. 14 is a schematic structural diagram of a transmit-end device according to an embodiment of this disclosure.

FIG. 14 is a schematic structural diagram of a transmit-end device according to an embodiment of this disclosure. As shown in FIG. 14, the transmit-end device 1400 includes at least one processor 1401, a memory 1402, at least one network interface 1404, and a user interface 1403. All components of the transmit-end device 1400 are coupled by a bus system 1405. It may be understood that the bus system 1405 is configured to implement connections and communication between the components. The bus system 1405 may further include a power bus, a control bus, and a status signal bus, in addition to a data bus. However, for clear description, various buses in FIG. 14 are marked as the bus system 1405.

The user interface 1403 may include a display, a keyboard, or a pointing device (for example, a mouse, a trackball, a touch panel, or a touchscreen).

It may be understood that the memory 1402 in this embodiment of this disclosure may be a volatile memory or a non-volatile memory, or may include both a volatile memory and a non-volatile memory. The non-volatile memory may be a ROM, a PROM, an EPROM), an EEPROM, or a flash memory. The volatile memory may be a RAM, which is used as an external cache. For example but not for limitation, a plurality of forms of RAMs such as an SRAM, a DRAM, an SDRAM, a DDR SDRAM, an ESDRAM, a SLDRAM, and a DRRAM may be used. The memory 1402 in the system and method described in this embodiment of this disclosure is intended to include but is not limited to these and any other appropriate types of memories.

In some implementations, the memory 1402 stores the following elements, executable modules or data structures, or a subset thereof, or an extended set thereof: an operating system 14021 and an application program 14022.

The operating system 14021 includes various system programs, for example, a framework layer, a kernel library layer, and a driver layer, for implementing various basic services and processing hardware-based tasks. The application program 14022 includes various application programs, for example, a media player and a browser, which are used to implement various application services. A program for implementing the method in this embodiment of this disclosure may be included in the application program 14022.

In this embodiment of this disclosure, the transmit-end device 1400 further includes the memory 1402, the processor 1401, and a computer program that is stored in the memory 1402 and capable of running by the processor 1401. When the computer program is executed by the processor 1401, the following steps are implemented:

determining a communications system parameter, where the communications system parameter is determined based on obtained second indication information, and/or determined based on a mapping relationship between an influencing factor of the communications system parameter and the communications system parameter, and the communications system parameter includes an SCS of a sidelink channel; and transmitting first indication information to a receive-end device, where the first indication information is used to indicate the communications system parameter, and the communications system parameter is used by the receive-end device to decode information carried on the sidelink channel.

The method disclosed in the foregoing embodiment of this disclosure may be applied to the processor 1401 or implemented by the processor 1401. The processor 1401 may be an integrated circuit chip and has a signal processing capability. During implementation, each step of the foregoing method may be completed by using an integrated logic circuit of hardware in the processor 1401 or an instruction in a form of software. The processor 1401 may be a general processor, a DSP, an ASIC, an FPGA, another programmable logic device, a discrete gate, a transistor logic device, or a discrete hardware component. All the methods, steps, and logical block diagrams disclosed in the embodiments of this disclosure can be implemented or performed by the processor. The general-purpose processor may be a microprocessor, or the processor may be any conventional processor or the like. The steps of the methods disclosed in the embodiments of this disclosure may be directly executed and completed by a hardware decoding processor, or may be executed and completed by a combination of hardware in a decoding processor and software modules. A software module may be located in a mature computer-readable storage medium in the art, such as a random access memory, a flash memory, a read-only memory, a programmable read-only memory, an electrically erasable programmable memory, a register, or the like. The computer-readable storage medium is located in the memory 1402. The processor 1401 fetches information in the memory 1402 and completes the steps of the foregoing methods in combination with hardware of the processor. Specifically, the computer-readable storage medium stores a computer program, and when the computer program is executed by the processor 1401, steps in the foregoing embodiment are implemented.

It may be understood that these embodiments described in the embodiments of this disclosure may be implemented by hardware, software, firmware, middleware, micro code, or a combination thereof. For hardware implementation, these embodiments may be implemented in one or more of a ASIC, a DSP, a DSPD, a PLD, an FPGA, a general-purpose processor, a controller, a micro controller, other electronic units used to perform functions described in this disclosure, or a combination thereof.

For software implementation, the technology described in the embodiments of this disclosure may be implemented by using modules (for example, procedures or functions) that perform the functions in the embodiments of this disclosure. Software code may be stored in the memory and executed by the processor. The memory may be implemented in the processor or out of the processor.

The transmit-end device provided in this embodiment of this disclosure may determine the communications system parameter based on the mapping relationship between the influencing factor of the communications system parameter and the communications system parameter, and transmit the first indication information indicating the communications system parameter of the sidelink channel to the receive-end device. Therefore, the receive-end device can determine, directly based on the first indication information, the communications system parameter for decoding the information carried on the sidelink channel. This avoids determining the communications system parameter in a blind detection mode. Therefore, workload of the receive-end device and complexity of decoding by the receive-end device are reduced, and communication efficiency is improved.

The transmit-end device 1400 can implement each process implemented by the transmit-end device in the foregoing embodiment. Details are not described again herein to avoid repetition.

An embodiment of this disclosure further provides a computer-readable storage medium, where the computer-readable storage medium stores a computer program, and when the computer program is executed by a processor, each process of the method for determining a communications system parameter in the foregoing embodiment is implemented, and a same technical effect can be achieved; or when the computer program is executed by a processor, each process of the method embodiment for indicating a communications system parameter in the foregoing embodiment is implemented, and a same technical effect can be achieved;

or when the computer program is executed by a processor, each process of the method embodiment for indicating a communications system parameter in the foregoing embodiment is implemented, and a same technical effect can be achieved. Details are not described again herein to avoid repetition. The computer-readable storage medium may be, for example, a ROM, a RAM, a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the embodiments of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the embodiments of this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in each of the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in the embodiments of this disclosure essentially, or the part contributing to the prior art, or some of the technical solutions may be implemented in a form of a computer software product. The computer software product is stored in a storage medium, and includes several instructions for instructing a computer device (which may be a personal computer, a server, a network device, or the like) to perform all or some of the steps of the method described in each of the embodiments of this disclosure. The foregoing storage medium includes any medium that can store program code, such as a USB flash drive, a removable hard disk, a ROM), a RAM, a magnetic disk, or an optical disc.

The foregoing descriptions are only embodiments of this disclosure, but this disclosure is not limited to such embodiments. For a person skilled in the art, this disclosure may be subject to various changes and variations. Any modification, equivalent replacement, improvement, or the like made without departing from the spirit and principle of this disclosure should fall within the scope of the claims of this disclosure.

What is claimed is:

1. A method for determining a communications system parameter, applied to a receive-end device, and comprising:
    determining a communications system parameter based on obtained first indication information, and/or determining a communications system parameter based on a mapping relationship between an influencing factor of the communications system parameter and the communications system parameter, wherein the communications system parameter comprises a Subcarrier Spacing (SCS) of a sidelink channel, and the communications system parameter is used to decode information carried on the sidelink channel.

2. The method according to claim 1, wherein the communications system parameter further comprises a Cyclic Prefix (CP) of the sidelink channel or a bandwidth part of the sidelink channel.

3. The method according to claim 1, wherein the communications system parameter comprises a first communications system parameter for decoding information carried on a physical sidelink control channel, and/or a second communications system parameter for decoding information carried on a physical sidelink data channel.

4. The method according to claim 3, wherein, if the first indication information indicates the first communications system parameter, the first indication information is obtained from a network message transmitted by a network-side device, wherein the network message comprises one of the following messages: System Broadcast Information (SI), a Radio Resource Control (RRC) message, or Downlink Control Information (DCI).

5. The method according to claim 3, wherein, if the first indication information indicates the second communications system parameter, the first indication information is obtained in either of the following manners:
    obtaining from a network message transmitted by a network-side device, wherein the network message comprises one of the following messages: SI, a RRC message, or DCI; and
    obtaining from information that is obtained by decoding Sidelink Control Information (SCI) on the physical sidelink control channel based on the first communications system parameter.

6. The method according to claim 1, further comprising:
    determining the communications system parameter based on the mapping relationship between the influencing factor of the communications system parameter and the communications system parameter by:
    determining a bandwidth part of the sidelink channel based on a first mapping relationship between the influencing factor of the communications system parameter and the bandwidth part; and
    determining the SCS of the sidelink channel based on a second mapping relationship between the bandwidth part of the sidelink channel and the SCS.

7. The method according to claim 1, wherein the influencing factor comprises at least one of the following:
an absolute moving speed of a transmit-end device, an absolute moving speed of the receive-end device, a relative moving speed between the transmit-end device and the receive-end device, a related parameter of a service currently being processed by the receive-end device, and a status measurement value of the sidelink channel.

8. The method according to claim 7, wherein the related parameter of the service comprises at least one of the following:
a priority of the service, a latency requirement of the service, reliability of the service, a throughput requirement of the service, and a bandwidth occupied by the service; and
the status measurement value of the sidelink channel comprises at least one of the following:
a frequency offset value, a Reference Signal Received Power (RSRP) value, and a Signal to Interference Plus Noise Ratio (SINR) value.

9. A method for indicating a communications system parameter, applied to a network-side device, and comprising:
determining a communications system parameter based on a mapping relationship between an influencing factor of the communications system parameter and the communications system parameter, wherein the communications system parameter comprises a SCS of a sidelink channel; and
transmitting first indication information to a receive-end device, wherein the first indication information is used to indicate the communications system parameter, and the communications system parameter is used by the receive-end device to decode information carried on the sidelink channel.

10. The method according to claim 9, wherein the communications system parameter further comprises a CP of the sidelink channel or a bandwidth part of the sidelink channel.

11. The method according to claim 9, wherein the communications system parameter comprises a first communications system parameter for decoding information carried on a physical sidelink control channel, and/or a second communications system parameter for decoding information carried on a physical sidelink data channel.

12. The method according to claim 9, wherein determining a communications system parameter based on a mapping relationship between an influencing factor of the communications system parameter and the communications system parameter comprises:
obtaining the influencing factor of the communications system parameter;
determining a bandwidth part of the sidelink channel based on a first mapping relationship between the influencing factor and the bandwidth part of the sidelink channel; and
determining the SCS of the sidelink channel based on a second mapping relationship between the bandwidth part of the sidelink channel and the SCS.

13. The method according to claim 9, wherein the influencing factor comprises at least one of the following:
an absolute moving speed of a transmit-end device, an absolute moving speed of the receive-end device, a relative moving speed between the transmit-end device and the receive-end device, a related parameter of a service currently being transmitted on the sidelink channel, and a status measurement value of the sidelink channel.

14. The method according to claim 13, wherein the related parameter of the service comprises at least one of the following:
a priority of the service, a latency requirement of the service, reliability of the service, a throughput requirement of the service, and a bandwidth occupied by the service; and
the status measurement value of the sidelink channel comprises at least one of the following:
a frequency offset value, an RSRP value, and an SINR value.

15. The method according to claim 9, wherein transmitting first indication information to a receive-end device comprises:
transmitting a network message to the receive-end device, wherein the network message carries the first indication information, wherein
the network message comprises one of the following messages: SI, an RRC message, or DCI.

16. A receive-end device, comprising:
a processor; and
a non-volatile memory communicatively coupled to the processor, the memory storing program instructions that, when executed by the processor, cause the processor to implement operations comprising:
determining a communications system parameter based on obtained first indication information, and/or determining a communications system parameter based on a mapping relationship between an influencing factor of the communications system parameter and the communications system parameter, wherein the communications system parameter comprises an SCS of a sidelink channel, and the communications system parameter is used to decode information carried on the sidelink channel.

17. The receive-end device according to claim 16, wherein the communications system parameter further comprises a CP of the sidelink channel or a bandwidth part of the sidelink channel.

18. The receive-end device according to claim 16, wherein the communications system parameter comprises a first communications system parameter for decoding information carried on a physical sidelink control channel, and/or a second communications system parameter for decoding information carried on a physical sidelink data channel.

19. The receive-end device according to claim 18, wherein, if the first indication information indicates the first communications system parameter, the first indication information is obtained from a network message transmitted by a network-side device, wherein the network message comprises one of the following messages: SI, an RRC message, or DCI.

20. The receive-end device according to claim 18, wherein, if the first indication information indicates the second communications system parameter, the first indication information is obtained in either of the following manners:
obtaining from a network message transmitted by a network-side device, wherein the network message comprises one of the following messages: SI, an RRC message, or DCI; and obtaining from information that is obtained by decoding SCI on the physical sidelink control channel based on the first communications system parameter.

* * * * *